United States Patent
Yeh et al.

(10) Patent No.: US 8,711,823 B2
(45) Date of Patent: Apr. 29, 2014

(54) SYSTEM FOR WIRELESS LOCAL AREA NETWORK (WLAN) TRANSMISSION AND FOR COEXISTENCE OF WLAN AND ANOTHER TYPE OF WIRELESS TRANSMISSION AND METHODS THEREOF

(75) Inventors: Chih-Hao Yeh, New Taipei (TW); Chia-Ming Chang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 222 days.

(21) Appl. No.: 13/451,624

(22) Filed: Apr. 20, 2012

(65) Prior Publication Data
US 2012/0218979 A1 Aug. 30, 2012

Related U.S. Application Data

(63) Continuation-in-part of application No. 12/478,865, filed on Jun. 5, 2009, now Pat. No. 8,184,566.

(51) Int. Cl.
*H04W 84/02* (2009.01)
*H04W 88/06* (2009.01)
*H04W 72/12* (2009.01)
*H04W 84/12* (2009.01)
*H04W 52/02* (2009.01)

(52) U.S. Cl.
CPC .......... *H04W 88/06* (2013.01); *H04W 72/1215* (2013.01); *H04W 84/12* (2013.01); *H04W 52/0212* (2013.01)
USPC ........................................................ 370/338

(58) Field of Classification Search
CPC ..... H04W 84/12; H04W 88/06; H04W 74/08; H04W 16/14; H04W 52/0212; H04W 72/1215
See application file for complete search history.

(56) References Cited

U.S. PATENT DOCUMENTS

| 7,010,329 | B2 | 3/2006 | Livet et al. |
| 7,643,443 | B2 | 1/2010 | Maufer et al. |
| 7,899,396 | B2 * | 3/2011 | Meylan et al. ............... 455/41.2 |
| 8,179,833 | B2 | 5/2012 | Attar et al. |
| 8,599,737 | B2 * | 12/2013 | Huang et al. .................. 370/315 |

(Continued)

FOREIGN PATENT DOCUMENTS

WO    WO 2008/001272    1/2008

OTHER PUBLICATIONS

IEEE[Hrsg.]:IEEE Standard for Information technology—Telecommunications and information exchange between systems—Local and metropolitan area networks—Specific requirements, Part 11: Wireless LAN Medium Access Control (MAC) and Physical Layer (PHY) Specifications, Standard 802.11,2007 Edition; Titel, Kapitel 9.6; pp. 1-6.

*Primary Examiner* — Min Jung
(74) *Attorney, Agent, or Firm* — McClure, Qualey & Rodack, LLP

(57) ABSTRACT

An embodiment of a system for the coexistence of a wireless local area network (WLAN) and another type of wireless transmission is provided. A WLAN module in a power saving mode is configured to transmit a polling request (PS-Poll) at a supported rate higher than any basic rate in order to obtain buffered data from an access point (AP) when the coexisting wireless transmission module is operating. The supported rate is encoded in a supported rate set announced by the AP, and the basic rate is encoded in a basic rate set announced by the AP, and the PS-Poll is a polling request relating to a power saving mode of operation.

16 Claims, 25 Drawing Sheets

(56) References Cited

U.S. PATENT DOCUMENTS

| | | |
|---|---|---|
| 8,611,317 B2 * | 12/2013 | Banerjea et al. ............ 370/338 |
| 2003/0165189 A1 | 9/2003 | Kadous |
| 2005/0111419 A1 * | 5/2005 | Kwon et al. ............... 370/338 |
| 2006/0264176 A1 | 11/2006 | Hong |
| 2007/0281617 A1 | 12/2007 | Meylan et al. |
| 2008/0089261 A1 | 4/2008 | Wentink |
| 2008/0130603 A1 | 6/2008 | Wentink et al. |
| 2009/0063740 A1 | 3/2009 | Yeh et al. |
| 2009/0196211 A1 | 8/2009 | Wentink |
| 2010/0008338 A1 * | 1/2010 | Tsfati et al. ............... 370/338 |
| 2010/0067423 A1 | 3/2010 | Sun et al. |
| 2010/0067424 A1 | 3/2010 | Sun et al. |
| 2010/0177755 A1 * | 7/2010 | Chu et al. .................. 370/338 |
| 2010/0208612 A1 | 8/2010 | Schultz et al. |
| 2011/0256834 A1 * | 10/2011 | Dayal et al. ............... 455/67.7 |

* cited by examiner

SYSTEM FOR WIRELESS LOCAL AREA NETWORK (WLAN) TRANSMISSION AND FOR COEXISTENCE OF WLAN AND ANOTHER TYPE OF WIRELESS TRANSMISSION AND METHODS THEREOF

CROSS REFERENCE TO RELATED APPLICATIONS

This application is a Continuation In Part of U.S. application Ser. No. 12/478,865 filed on Jun. 5, 2009, the entirety of which is incorporated by reference herein.

BACKGROUND OF THE INVENTION

1. Field of the Invention

The invention relates to wireless local area network (WLAN), and more particularly, to systems for WLAN transmission with reduced power consumption and for the coexistence of WLAN and another type of wireless transmission (e.g. Bluetooth, WiMAX or others) with a higher download rate.

2. Description of the Related Art

Wireless local area network (WLAN) modules embedded in mobile electronic devices such as notebooks, cellular phones, portable gaming devices, portable multimedia players, global positioning system (GPS) receivers, or others, are used to wirelessly connect to the Internet for browsing Web pages, transceiving e-mails, chatting on-line, downloading and playing multimedia content, or others. Since mobile electronic devices typically provide limited battery power, extending the battery life thereof is an essential technical goal for those skilled in the art. Thus, decreasing power consumption of embedded WLAN modules may extend usage life of mobile electronic devices thereof.

Mobile electronic devices, are increasingly, not only equipped with WLAN modules but also Bluetooth, WiMAX modules, or others to enhance connectivity thereof, to various peer devices or the Internet. Because both WLAN and Bluetooth/WiMAX wireless technologies share the same spectrums and are typically located in close physical proximity to one another when operating, interference therebetween may occur if transmission or receiving time slots are not appropriately scheduled. The lengths of the time slots assigned to the WLAN module typically vary with the bandwidth requirement of the Bluetooth and/or WiMAX module(s). Thus, efficient and flexible utilization of the assigned windows to receive buffered data from an access point or station so as to consume less power, reduce interference possibility with the other WLAN devices, or others, is also important for the coexistence of the WLAN and Bluetooth/WiMAX.

BRIEF SUMMARY OF THE INVENTION

An embodiment of a system for the coexistence of a wireless local area network (WLAN) and another type of wireless transmission is provided. A WLAN module in a power saving mode is configured to transmit a polling request (PS-Poll) at a supported rate higher than any basic rate in order to obtain buffered data from an access point (AP) when the coexisting wireless transmission module is operating. The supported rate is encoded in a supported rate set announced by the AP, and the basic rate is encoded in a basic rate set announced by the AP, and the PS-Poll is a polling request relating to a power saving mode of operation.

An embodiment of a system for WLAN transmission accompanying with a radio frequency (RF) module is provided, containing at least a baseband module and a media access control (MAC) unit. The MAC unit coupling the baseband module is configured to transmit a polling request (PS-Poll) at a supported rate higher than any basic rate in order to obtain buffered data from an access point (AP) when a coexisting wireless transmission module is operating. The supported rate is encoded in a supported rate set announced by the AP, and the basic rate is encoded in a basic rate set announced by the AP.

An embodiment of a method for wireless local area network (WLAN) transmission, performed by a media access control (MAC) unit, is provided, containing at least one step. A polling request (PS-Poll) is transmitted at a supported rate higher than any basic rate in order to obtain buffered data from an access point (AP) when a coexisting Bluetooth or WiMAX module is operating. The supported rate is encoded in a supported rate set announced by the AP, and the basic rate is encoded in a basic rate set announced by the AP.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is reference to the appended claims.

Figure 1:
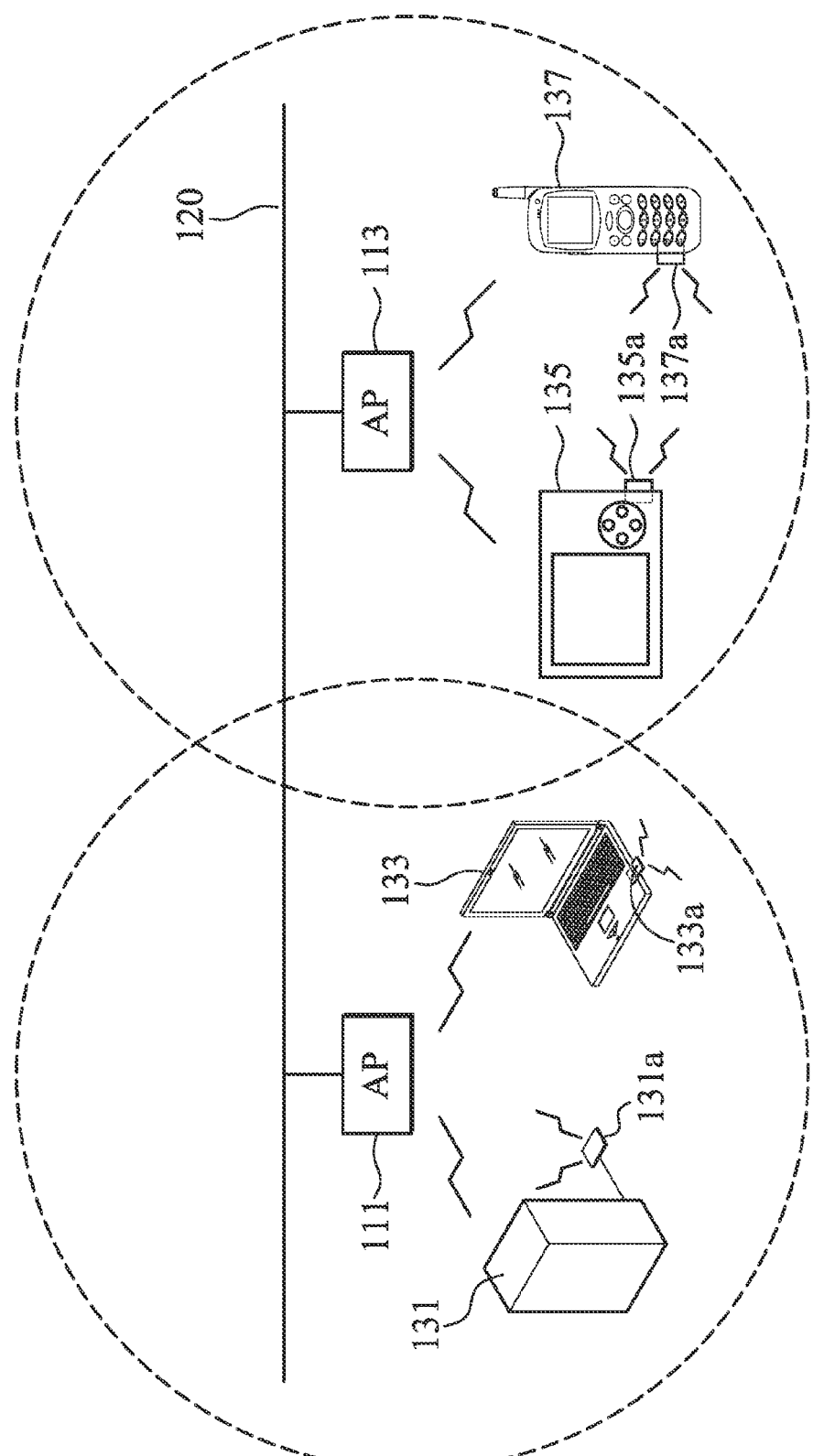
FIG. 1 shows a schematic diagram of wireless local area networks (WLAN)

A wireless Local Area Network (WLAN) is typically implemented as an extension to wired LANs within a building and can provide the final few meters of connectivity between a wired network and mobile or fixed devices. WLAN is based on the IEEE 802.11 standard. Most WLAN may operate in the 2.4 GHz license-free frequency band and have throughput rates of up to 2 Mbps. The 802.11b standard is only direct sequence, and provides throughput rates of up to 11 Mbps. The 802.11g standard operates at a maximum raw data rate of 54 Mbit/s, or about 19 Mbit/s net throughput. As shown in FIG. 1, an access point/base station 111 or 113 connects to a LAN by means of an Ethernet cable 120. Access points (APs) 111 and 113 typically receive, buffer, and transmit data between the WLAN and the wired network infrastructure. Each access point may support, on average, twenty devices and have a coverage varying from 20 meters in area with obstacles (walls, stairways, elevators) and up to 100 meters in area with clear line of sight. A WLAN module 131a, 133a, 135a or 137a connects users via an access point 111 or 113 to the rest of the LAN, and can be equipped with or fully integrated within a mobile or fixed device, such as a personal computer 131, a notebook 133, a portable gaming device 135, a cellular phone 137 or others.

Figure 2:
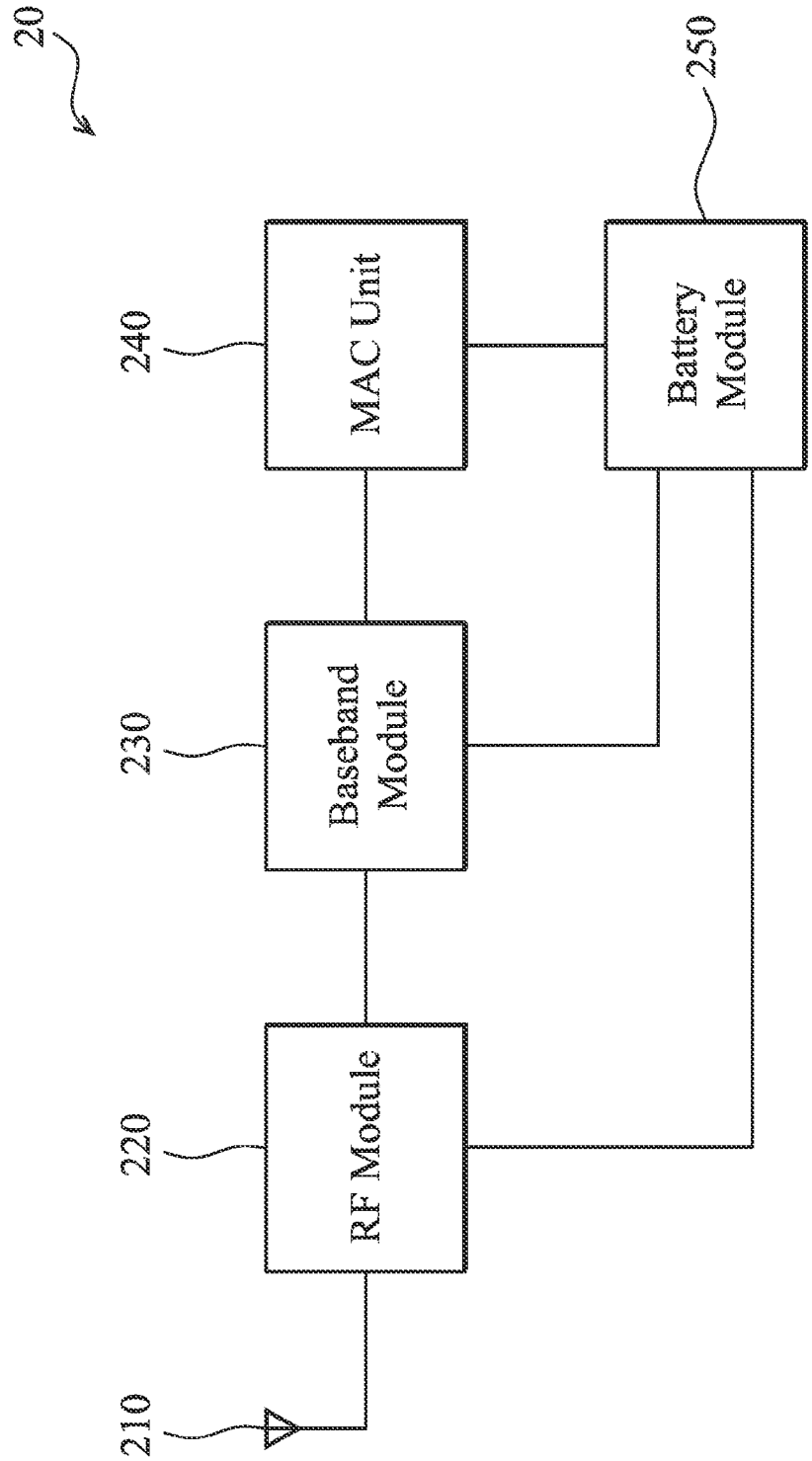
FIG. 2 shows a hardware architecture of an embodiment of a WLAN module.

The hardware architecture of an embodiment of a WLAN module 20 (may also called a non-AP station) as shown in FIG. 2 contains at least an antenna 210, a radio frequency (RF) module 220, a baseband module 230 and a media access control (MAC) unit 240 powered by an installed battery 250. The RF module 220 receives wireless radio frequency signals, converts the received signals to baseband signals to be processed by the baseband module 230, or receives baseband signals from the baseband module 230 and converts the received signals to wireless radio frequency signals to be transmitted to an access point/base station 111 or 113. The RF module 220 performs radio frequency conversion. A mixer resident on the RF module 220 multiplies the baseband signals with a carrier oscillated in the radio frequency of WLAN. The baseband module 230 further converts the baseband signals to digital signals, and processes the digital signals, and vice versa. Hardware circuits related to analog to digital conversion (ADC)/digital to analog conversion (DAC), gain adjustments, modulation/demodulation, encoding/decoding, and so on are installed in the baseband module 230. The MAC unit 240 performs a Carrier Sense Multiple Access with a Collision Avoidance (CSMA/CA) mechanism. The CSMA/CA protocol works as follows. The MAC unit 240 waiting to transmit senses the medium with the aid of the antenna 210, RF module 220 and baseband module 230. If the medium is busy (i.e. another WLAN device is transmitting) then the MAC unit 240 defers its transmission later. If the medium is sensed free for a specified time (called Distributed Inter Frame Space (DIFS) in the standard) then the MAC unit 240 is allowed to transmit packets. The AP 111 or 113 checks the Cyclic Redundancy Check (CRC) code of the received packet and sends an acknowledgment packet (ACK). Receipt of the ACK indicates to the MAC unit 240 that no collision has occurred. If the MAC unit 240 does not receive the ACK then it retransmits the fragment until it receives an ACK or is discarded after a given number of retransmissions.

Figure 3:
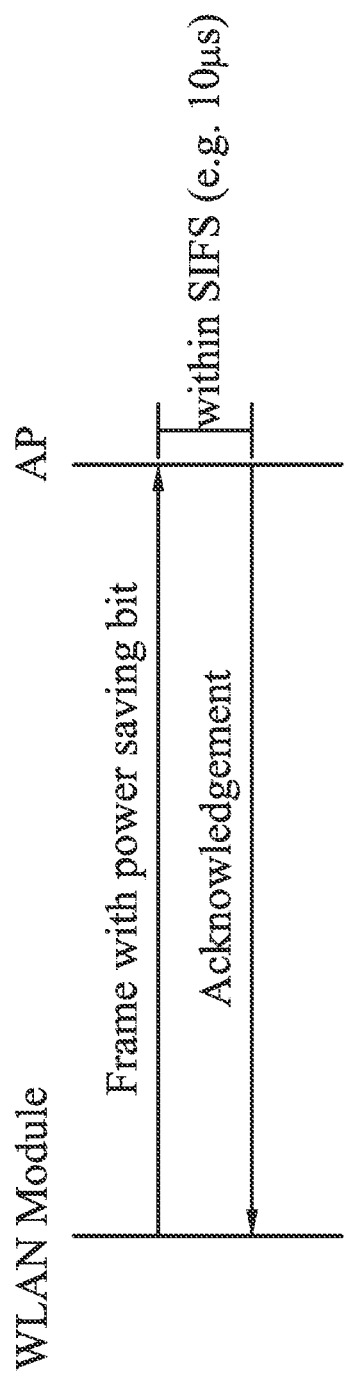
FIG. 3 is a diagram showing exemplary interactions for delivering information indicating that a WLAN module will enter a Power Saving (PS) mode.
Figure 4:
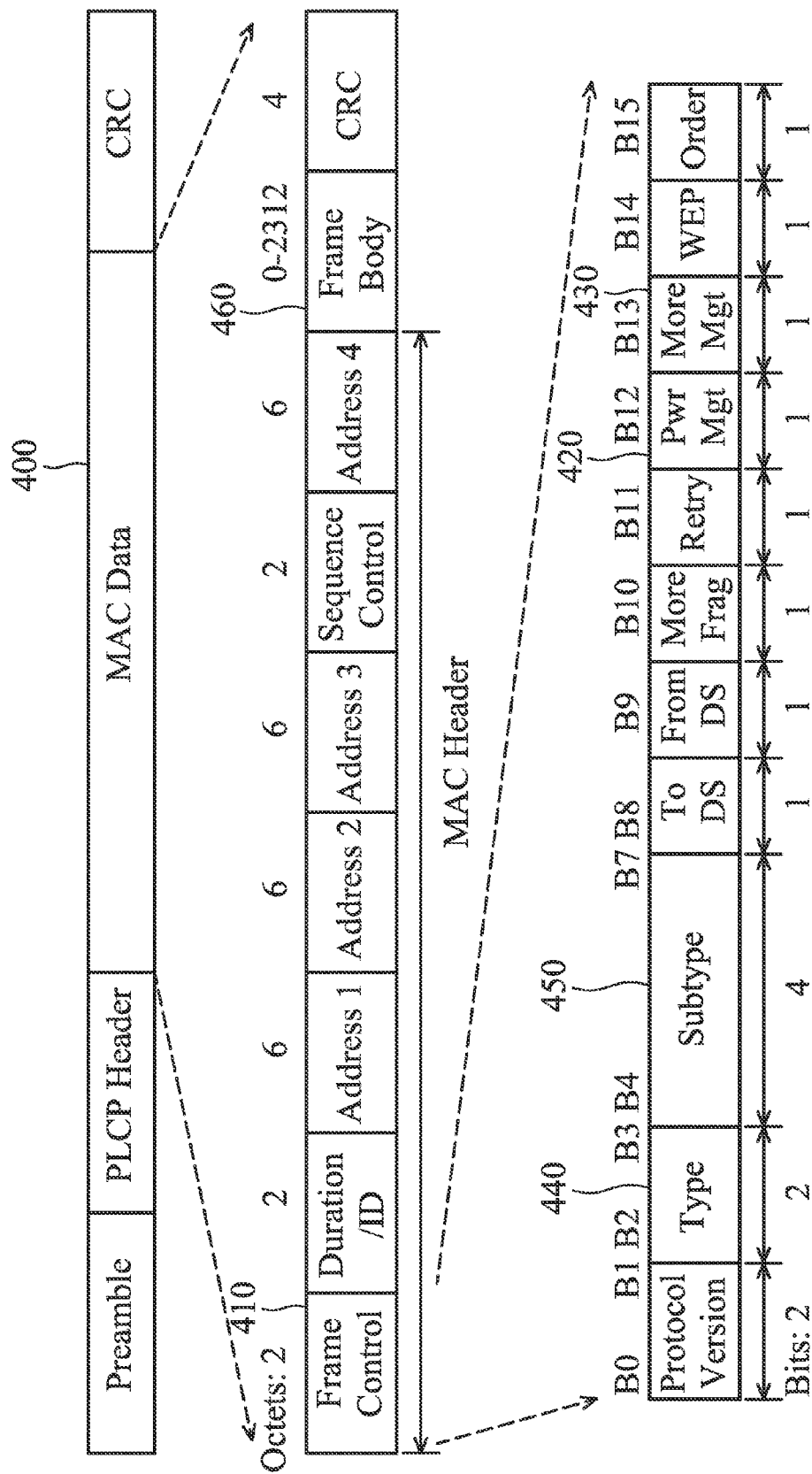
FIG. 4 is a schematic diagram showing an embodiment of a media access control (MAC) frame format.
Figure 5:
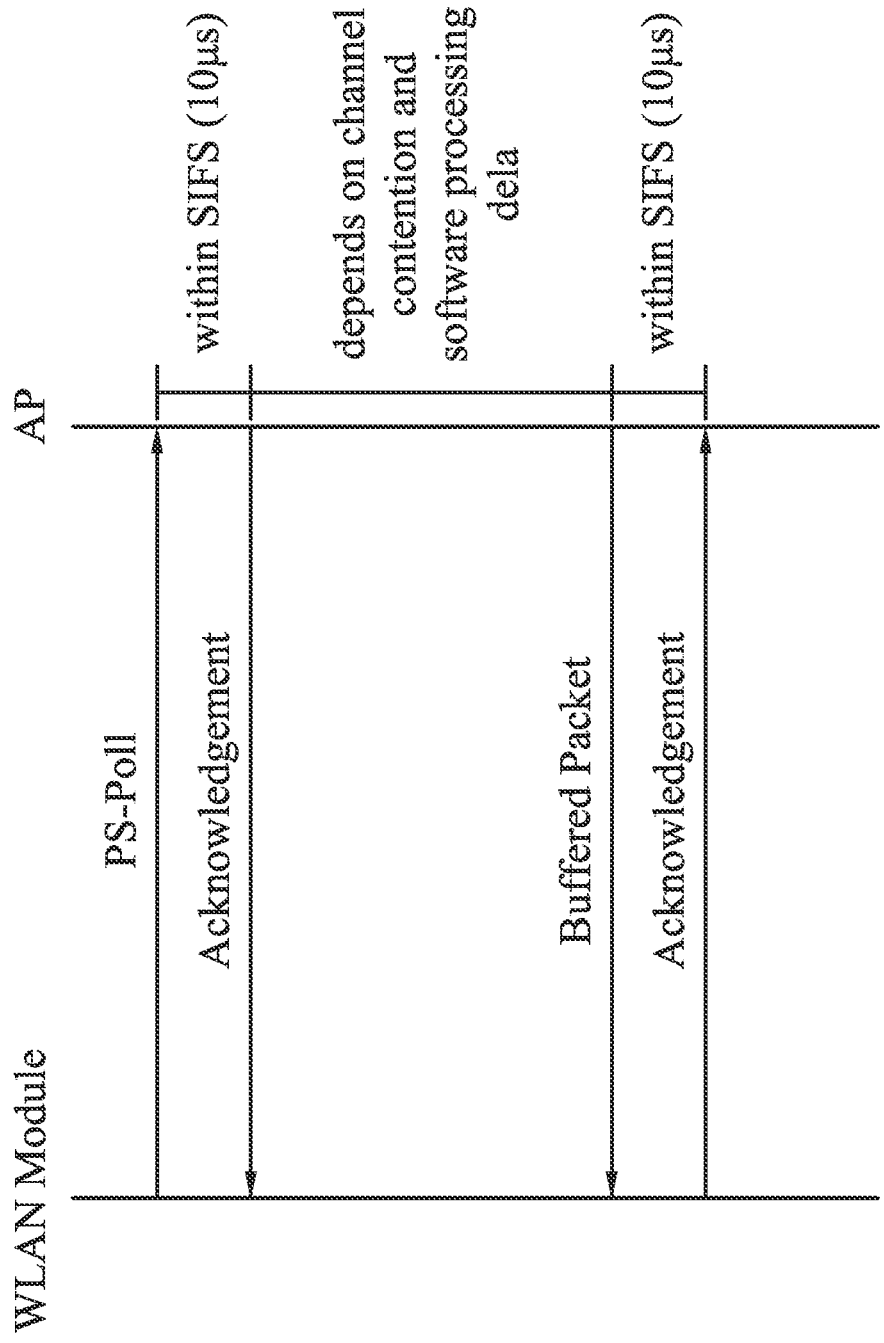
FIG. 5 is diagram showing exemplary interactions for obtaining buffered packets from an access point (AP)

In order to extend the battery life, the WLAN module 131a, 133a, 135a or 137a goes into a power saving (PS) mode (also called sleep mode) for long time periods. Information indicating that PS mode will be entered in after the transmission of this frame is further notified to the AP 111 or 113, as shown in FIG. 3. The information is carried by a power management bit 420 of a frame control field 410 of MAC data 400, as shown in FIG. 4. Subsequently, the AP 111 or 113 maintains a continually updated record of the WLAN modules 131a, 133a, 135a and 137a currently working in the PS mode, and buffers the packets addressed to the WLAN modules until the WLAN modules specifically request the packets by sending a polling request (briefly in PS-Poll). As part of a Beacon Frame, the AP 111 or 113 periodically transmits information regarding which WLAN modules have packets buffered at the AP, where the information is carried in a traffic indication map (TIM) Information Element of the frame body field 460 of the MAC data 400. Thus, the WLAN modules 131a, 133a, 135a and 137a periodically wake up to receive the Beacon Frame. If there is an indication indicating at least one packet stored at the AP 111 or 113 and waiting for delivery, then the corresponding WLAN module stays awake and sends a PS-Poll to the AP to obtain the buffered packet. The signaling therebetween for acquisition of buffered packets may refer to FIG. 5. Furthermore, if there is an indication indicating more data stored at the AP 111 or 113 in the received data frame or management frame, which is carried in a more data bit 430 of a frame control field 410 of MAC data 400, then the corresponding WLAN module stays awake and sends a PS-Poll to the AP. The Beacon Frame, PS-Poll, acknowledgment and data frame can be distinguished by the type and subtype bits 440 and 450 of a frame control field 410 of MAC data 400. Details of their values may refer to the following table:

| Type Value | Type Description | Subtype Value | Subtype Description |
|---|---|---|---|
| 00 | Management | 0001 | Association Response |
| 00 | Management | 0011 | Reassociation Response |
| 00 | Management | 0101 | Probe Response |
| 00 | Management | 1000 | Beacon |
| 01 | Control | 1010 | PS-Poll |
| 01 | Control | 1101 | Acknowledgment |
| 10 | Data | 0000 | Data |

Figure 6:
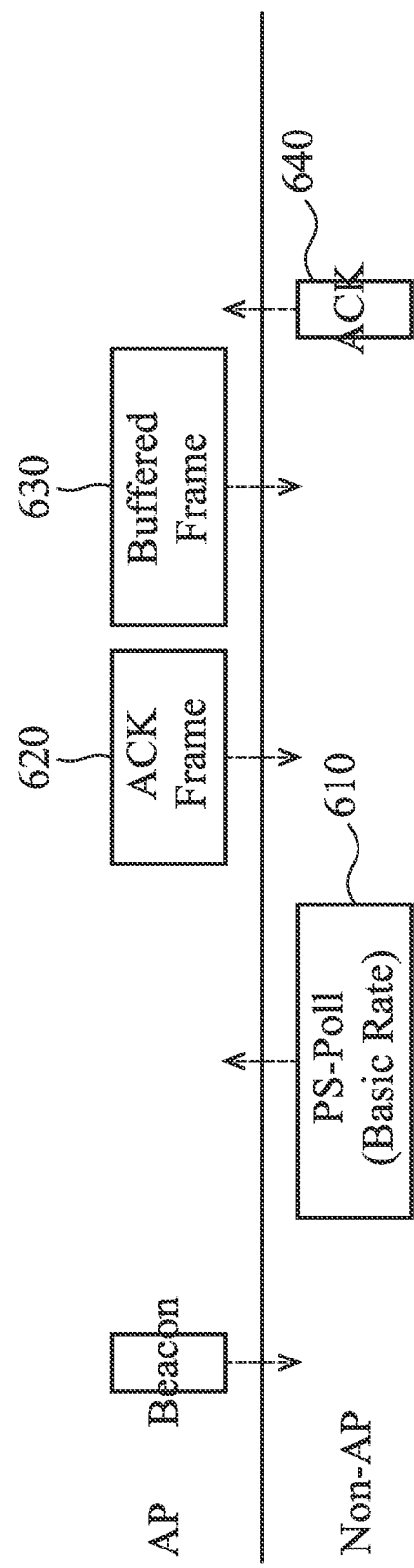
FIG. 6 shows a schematic diagram of frame exchange for obtaining buffered packets in a time line.

The 2007 802.11 specification (ISBN 0-7381-5656-9), states that control frames that initiate a frame exchange shall be transmitted at one of the basic rates in the BSS-BasicRateSet parameter of a Beacon Frame. The basic rate set typically contains 1M and 2M bytes per second (b/s). FIG. 6 shows a schematic diagram of frame exchange for obtaining buffered packets in a time line. After receiving a PS-Poll 610 at one basic rate, the AP 111 or 113 replies with an acknowledgment 630 at a rate that is equal to or lower than the receiving rate of the PS-Poll. Issuance of a PS-Poll 610 at 1 and 2 Mb/s may require 352 and 176 microseconds (µs), respectively and issuance of acknowledgment 620 at 1 and 2 Mb/s may require 304 µs and 152 µs, respectively. It is to be understood that the longer amount of time the WLAN module spends to transmit the PS-Poll or receive the acknowledgment the more battery power it consumes. Therefore, PS-Poll transmission and acknowledgement receiving at one basic rate typically takes a longer amount of time and consumes more battery power than that at a higher rate.

Figure 7:
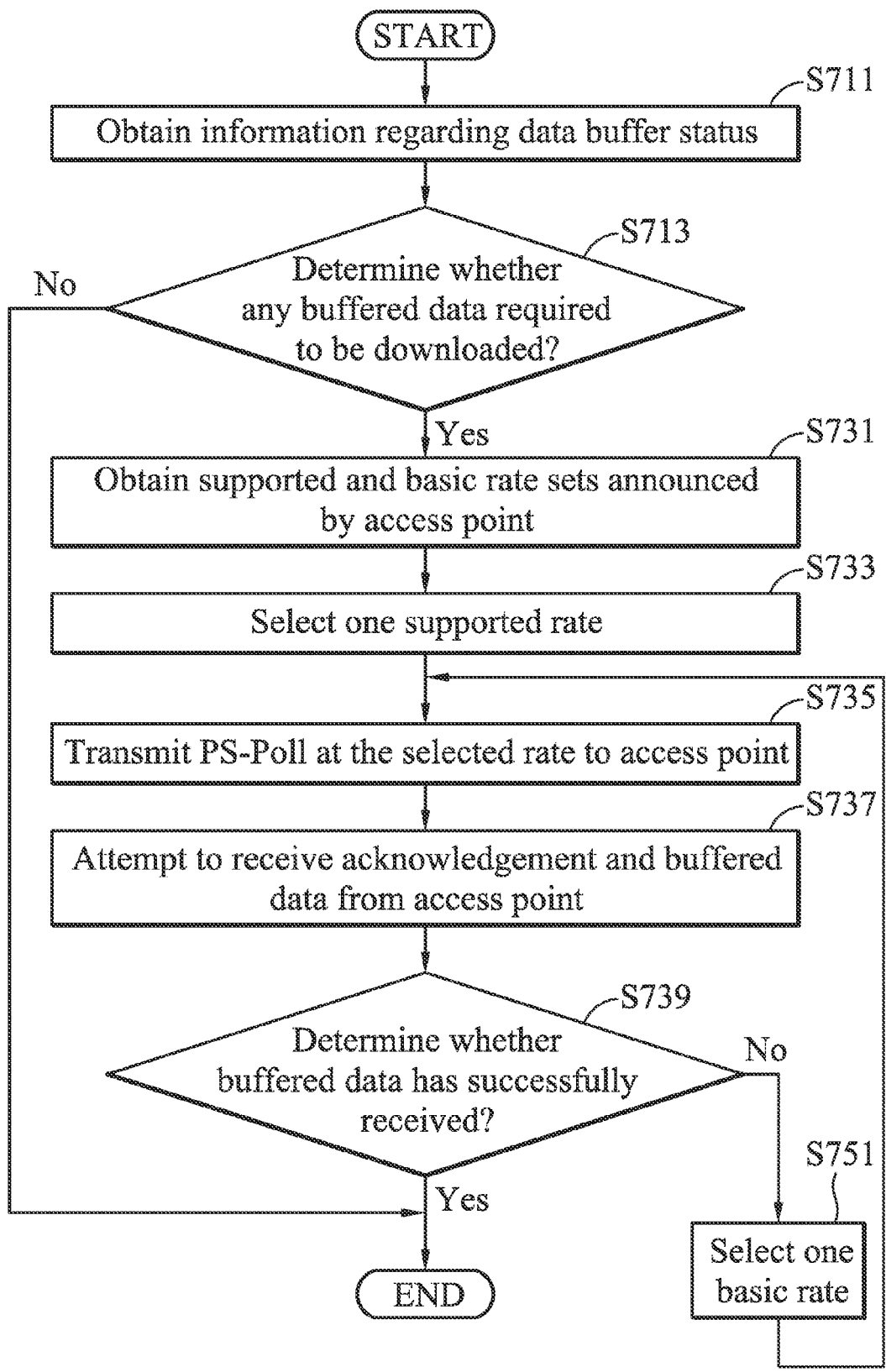
FIG. 7 is a flow chart illustrating an embodiment of a method for obtaining buffered data from an AP.
Figure 8:
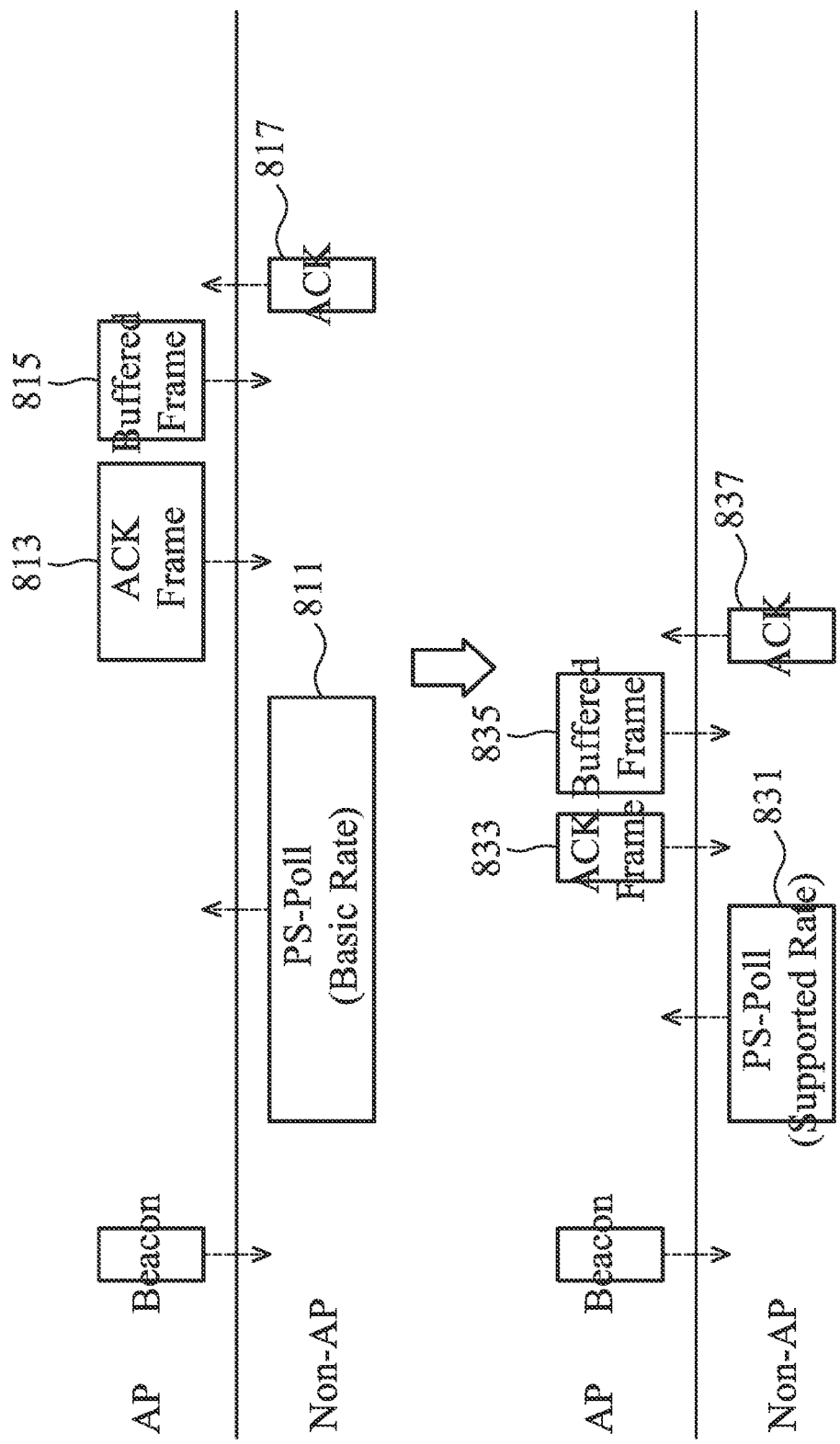
FIG. 8 shows a schematic diagram illustrating PS-Poll transmission and acknowledgment at a basic rate and a supported rate.
Figure 9A:
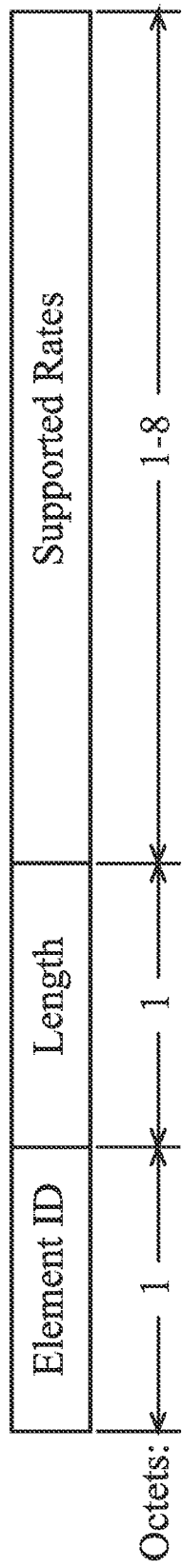
FIGS. 9A and 9B show supported rates element format and extended supported rates element format.
Figure 9B:
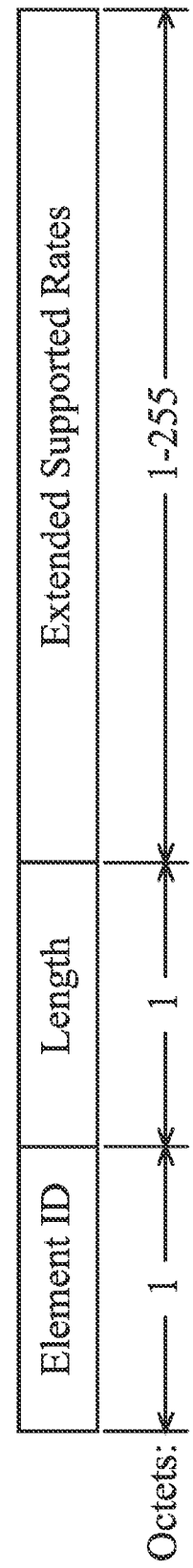

To reduce process time and/or save battery power, an embodiment of a method is introduced to transmit PS-Poll at one supported rate (optimally reaching 24 Mb/s) in a first run. Theoretically, the corresponding acknowledgment and the buffered data can be successfully obtained later. The increased data rate, however, may increase bit error rate (BER) or shorten effective range, resulting in an unsuccessful receipt of the PS-Poll by the AP. Thus, the proposed embodiment transmits the PS-Poll at one basic rate in subsequent runs when the buffered data is not successfully obtained. A flow as shown in FIG. 7 is repeatedly performed when the WLAN module 131*a*, 133*a*, 135*a* or 137*a* is awakened. To begin, information is obtained by the WLAN module 131*a*, 133*a*, 135*a* or 137*a*, regarding a data buffer status indicating whether any data has been buffered in the AP (step S711). The information may be obtained from a volatile memory, which is recognized from a TIM information element of the frame body field 460 of the MAC data 400 of a prior received Beacon Frame, or a more data bit 430 of a prior received data or management frame. The process ends when no buffered data is required to be downloaded. When any buffered data is required to be downloaded, supported and basic rate sets announced by the AP are obtained from a buffered memory (step S731). The supported and basic rate sets may be previously obtained from a Beacon, Probe Response, Association Response or Reassociation Response management frame and buffered in the memory. Within the management frame, each Supported Rate contained in the BSSBasicRateSet parameter is encoded as an octet with the most significant bit (MSB, bit 7) set to 1, and bits 6 through 0 are set to the data rate. FIGS. 9A and 9B respectively show the supported rates element format and the extended supported rates element format. For example, a 2.25 Mb/s rate contained in the BSSBasicRateSet parameter is encoded as X'85'. Rates not contained in the BSSBasicRateSet parameter are encoded with the MSB set to 0, and bits 6 through 0 are set to the appropriate value from a predetermined valid range table (e.g., a 2 Mb/s rate not contained in the BSSBasicRateSet parameter is encoded as X'04'). One supported rate is selected from the obtained supported rate set (step S733) and a PS-Poll is transmitted to the AP at the selected rate (step S735) in order to reduce transmission time and battery power consumption. For example, about 352 µs and 304 µs are consumed by transmitting the PS-Poll and replying with an acknowledgment at 1 Mb/s (one basic rate) respectively, as shown in 811 and 813 of FIG. 8, while about 110 µs and 34 µs are consumed by transmitting the buffered 240 bytes of a Voice over Internet Protocol (VoIP) packet at 24 Mb/s and replying with an acknowledgment at 24 Mb/s (one supported rate) respectively, as shown in 815 and 817 of FIG. 8. In this case, most of the required time (about 82%) is spent to transmit and acknowledge the PS-Poll at a slower basic rate. At 24 Mb/s, the transmission time of the PS-Poll is reduced to 34 µs, as shown in 831 of FIG. 8, resulting in the reduction of the acknowledgement transmission time to 34 µs. And then, buffered data following an acknowledgment is attempted to be received (step S739). The process ends when the buffered data has been successfully received. A failed data reception may be determined, when no acknowledgment is received by the WLAN module after 10 µs (also referred to as short interframe space, SIFS) subsequent to the issuance of a PS-Poll. Otherwise, the PS-Poll is required to be retransmitted until the buffered data is successfully obtained. In each subsequent attempt, one basic rate is selected from the obtained basic rate set (step S751) and a PS-Poll is transmitted to the AP at the selected rate (step S735) so as to deliver the PS-Poll with lower BER or lengthened effective range.

Figure 10:
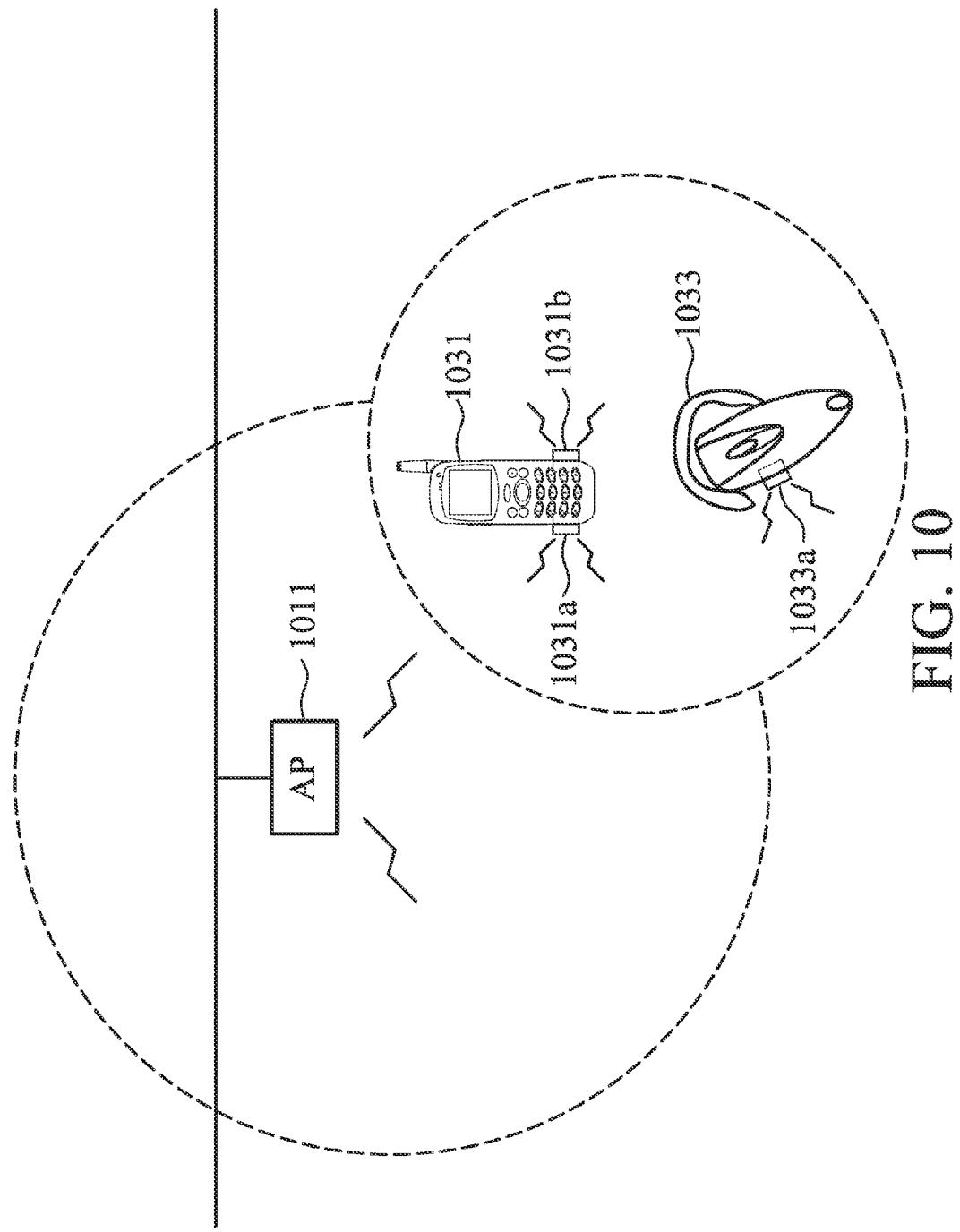
FIG. 10 shows a schematic diagram of a cellular phone participating WLAN and personal area network (PAN)
Figure 11:
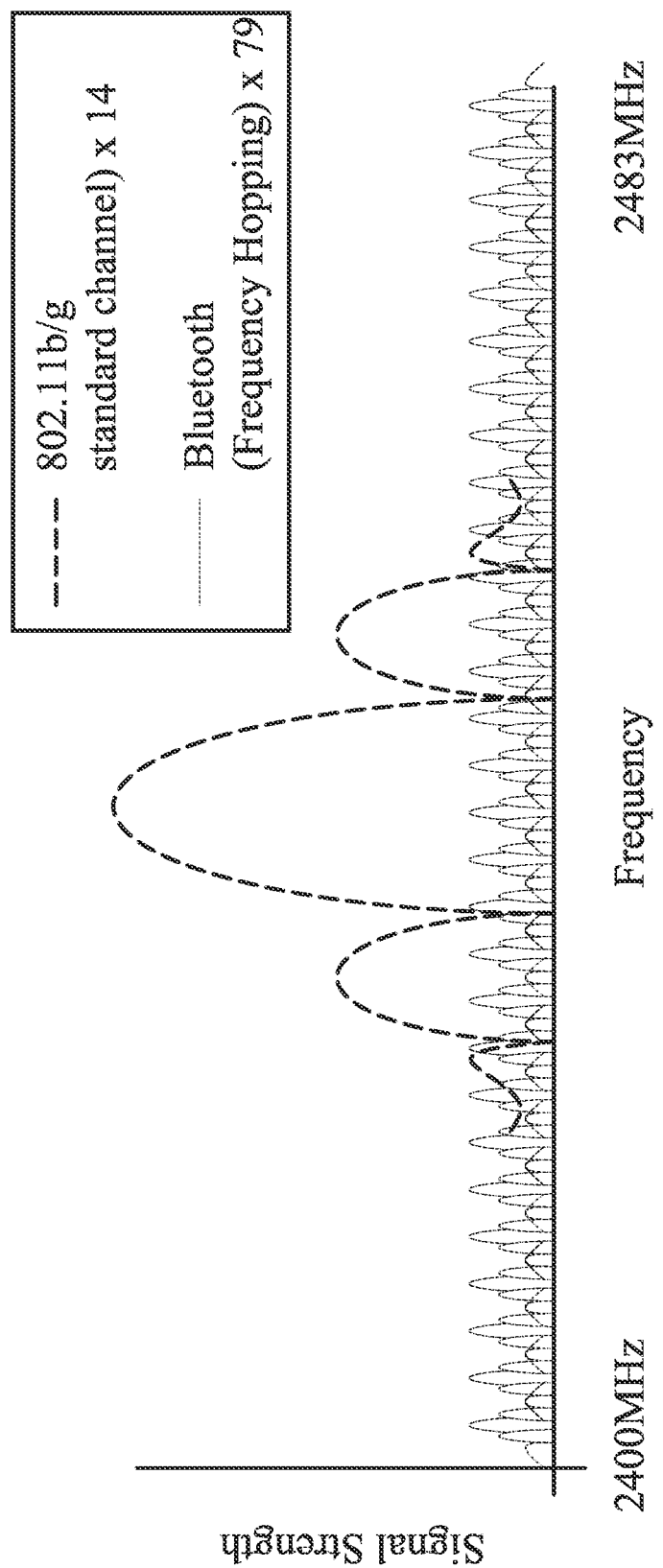
FIG. 11 is a schematic diagram showing interference between WLAN and Bluetooth.

Referring to FIG. 10, a cellular phone 1031 may associate with a WLAN via a WLAN module 1031*a* and further communicates with a Bluetooth handset 1033 (or a Bluetooth car audio, or others) through Bluetooth modules 1031*b* and 1033*b*. Bluetooth is an open wireless protocol for exchanging data over short distances from fixed and mobile devices, creating personal area networks (PANs). The VoIP data from Internet may be received through WLAN connection and vice versa. Then, the cellular phone 1031 may transmit the voice data through the established PAN to the Bluetooth handset 1033 and receive speech signals captured by a microphone of the Bluetooth handset 1033 via the Bluetooth module 1031*b*. The Bluetooth handset 1033 may also be employed as a wireless earphone to play music delivered from the cellular phone 1031. WLAN and Bluetooth both occupy a section of the 2.4 GHz Industrial, Scientific, and Medical (ISM) band, which is 83 MHz-wide. Referring to FIG. 11, Bluetooth uses Frequency Hopping Spread Spectrum (FHSS) and is allowed to hop between 79 different 1 MHz-wide channels in the band. WLAN uses Direct Sequence Spread Spectrum (DSSS) instead of FHSS. Its carrier remains centered on one channel, which is 22 MHz-wide. When the WLAN module 1031*a* and the Bluetooth module 1031*b* are operating in the same area, the single 22 MHz-wide WLAN channel occupies the same frequency space as the 22 of the 79 Bluetooth channels which are 1 MHz-wide. When a Bluetooth transmission occurs on a frequency that lies within the frequency space occupied by a simultaneous WLAN transmission, a certain level of interference may occur, depending on the strength of each signal. Because both the WLAN module 1031*a* and Bluetooth module 1031*b* share spectrum and are often located in close physically proximity to one another, avoiding interference therebetween is required.

Figure 12:
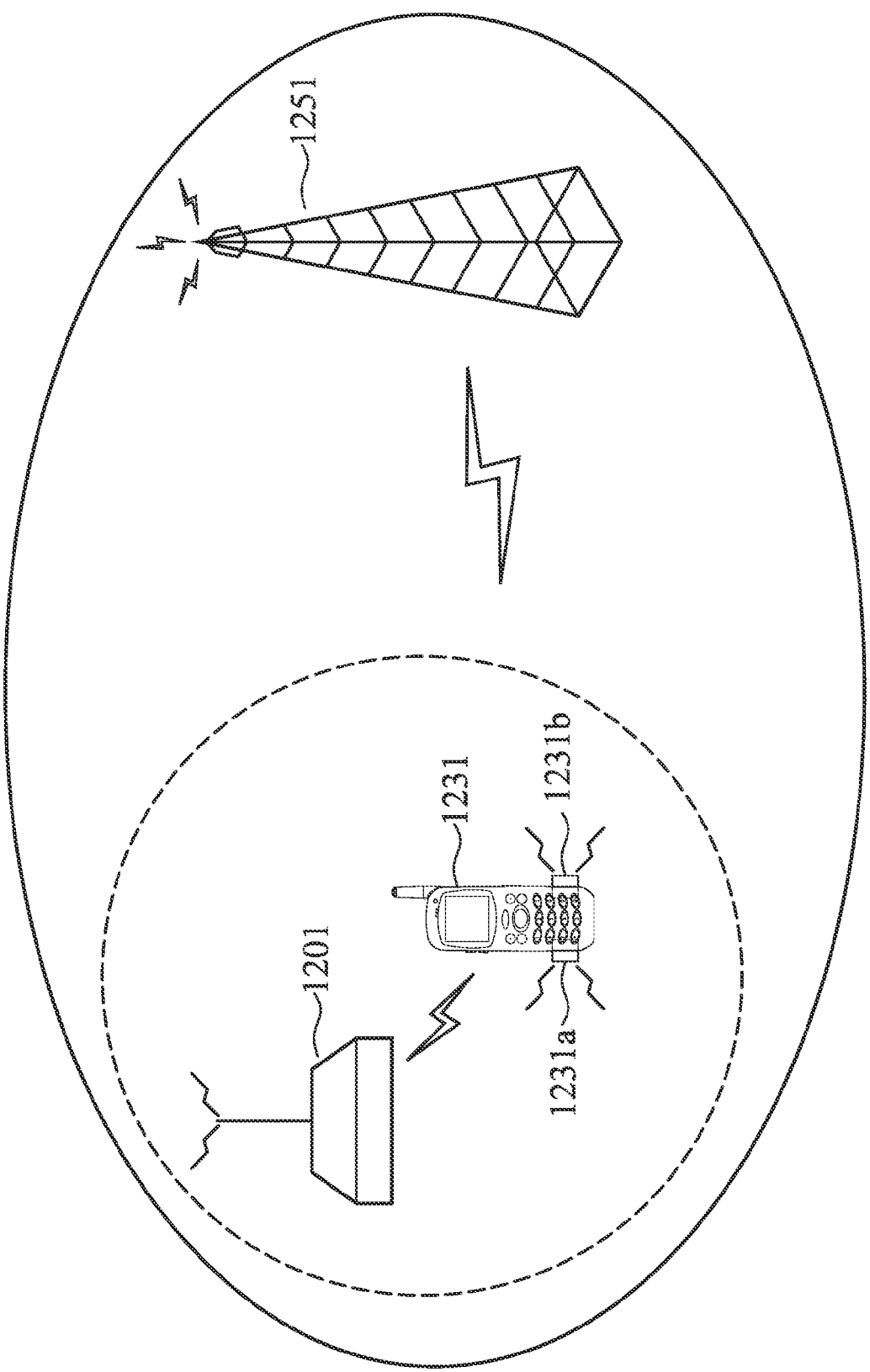
FIG. 12 shows a schematic diagram of a cellular phone participating WLAN and WiMAX.
Figure 13:
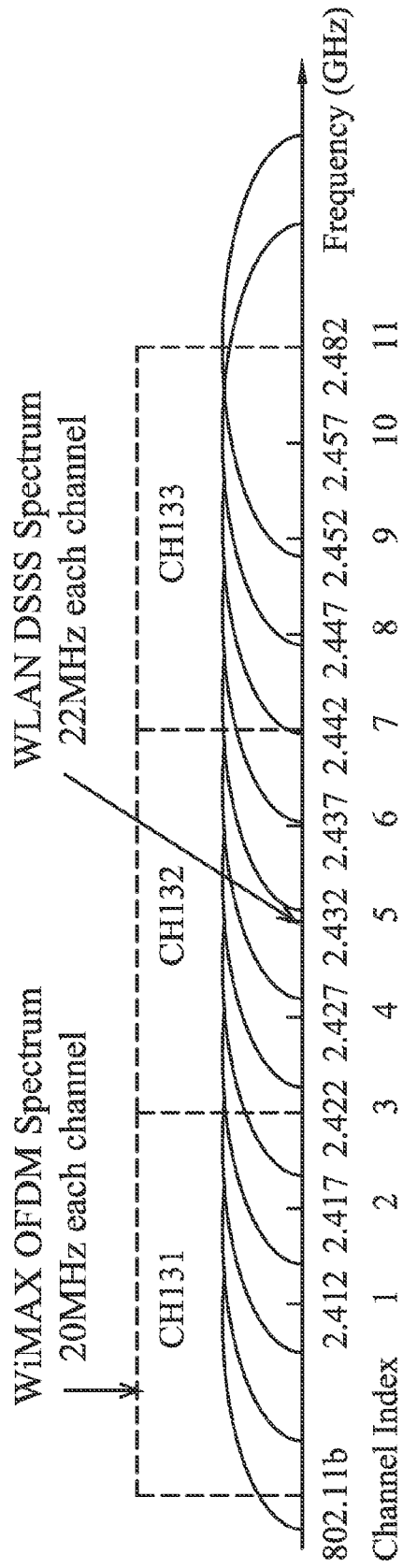
FIG. 13 is a schematic diagram showing interference between WLAN and WiMAX.

IEEE 802.16 (WiMAX) represents a standard for wireless broadband access, and is designed for outdoor, long-range and carrier-class applications with high throughput. Referring to FIG. 12, a cellular phone 1231 may associate with a WLAN via a WLAN module 1231*a* and further camp on a WiMAX base station 1251 through a WiMAX module 1231*b*, where a WLAN access point 1201 is deployed inside the 802.16 cell. The 802.16 standard supports both licensed and license-exempt spectrum, where 802.16a specifies the operation in the 2-10 GHz band, supporting raw bit rates of up to 75 Mb/s with variable channel bandwidths of 1.5 MHz to 20 MHz. The WiMAX module 1231*b* may use Orthogonal Frequency-Division Multiplexing (OFDM) with 20 MHz-wide bandwidth. Three non-overlapping channels may be utilized, as shown in FIG. 13, labeled as CH131 to CH133. The WLAN module 1231*a* may use direct sequence spread spectrum (DSSS) with a 22 MHz-wide bandwidth. A total of 11 overlapping channels may be allocated for WLAN in the ISM band. When a WiMAX transmission occurs on a frequency that lies within the frequency space occupied by a simultaneous WLAN transmission, a certain level of interference may occur, depending on the strength of each signal. As such, avoiding interference between WiMAX and WLAN transmissions is important.

Figure 14:
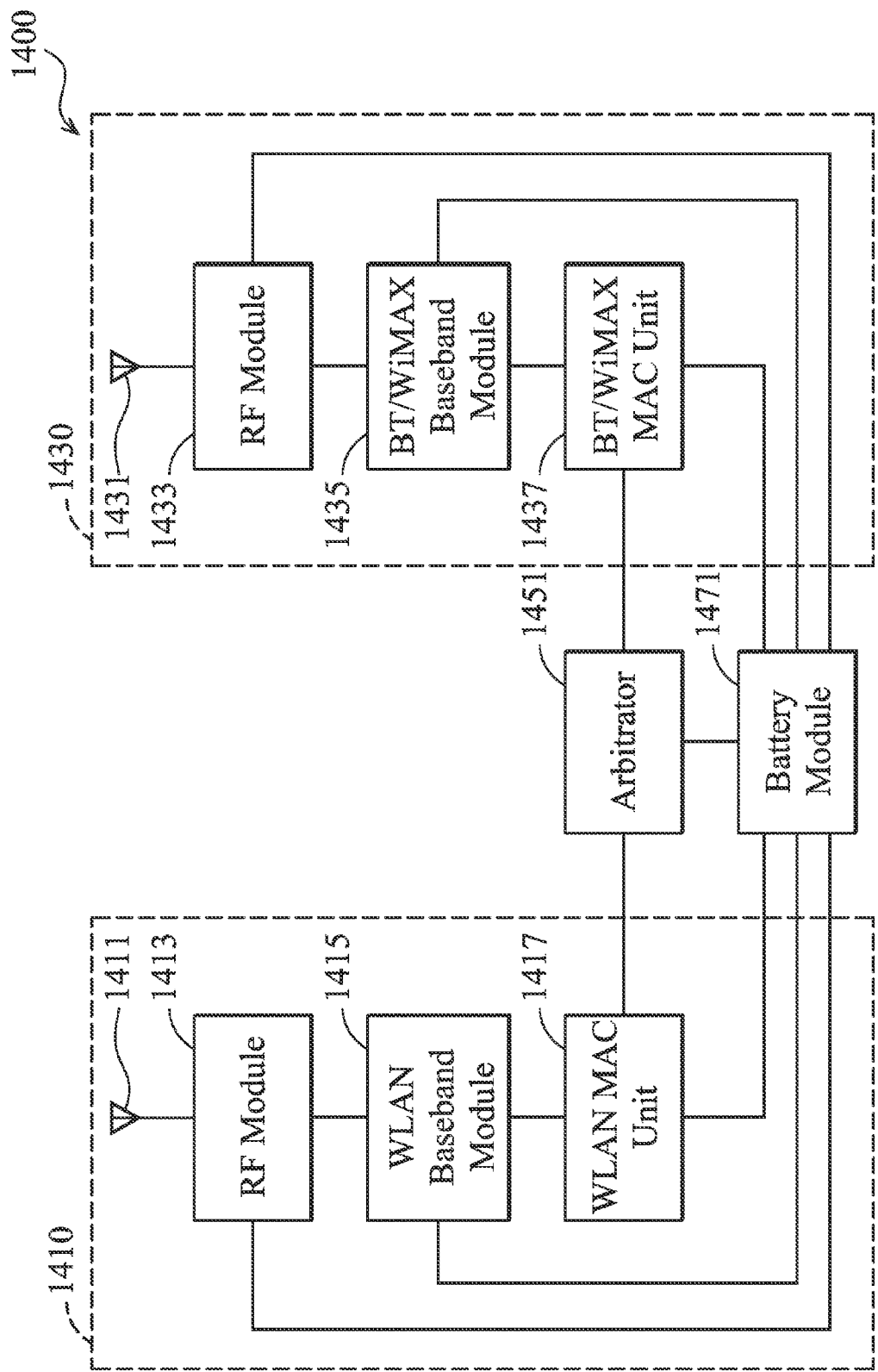
FIG. 14 shows a hardware architecture of an embodiment of a system for coexistence of WLAN and Bluetooth/WiMAX modules.

The hardware architecture of an embodiment of a coexistence system 1400 containing at least a WLAN module 1410, a Bluetooth/WiMAX module 1430 and an arbitrator 1451 powered by a battery module 1471, as shown in FIG. 14, is provided. Each of the WLAN and Bluetooth/WiMAX modules 1410 and 1430 has an antenna 1411 or 1431, a Baseband module 1415 or 1435 and a MAC unit 1417 or 1437. Those skilled in the art may integrate the antennas 1411 and 1431 into a single antenna and the invention is not limited thereto. The RF module 1433 performs similar operations as that of the RF module 220 for communicating with the Bluetooth handset 1033 or the WiMAX base station 1251 and is only briefly described hereinafter. The Bluetooth/WiMAX baseband module 1435 performs similar operations as that of the Baseband module 230 and is only briefly described hereinafter. For the operation of the WLAN MAC unit 1417, reference may be made to the above description of the MAC unit 240. The arbitrator 1451 coordinates transceiving between the WLAN MAC unit 1417 and the Bluetooth/WiMAX MAC unit 1437 by allocating time slots for their links to avoid interference therebetween.

Figure 15:
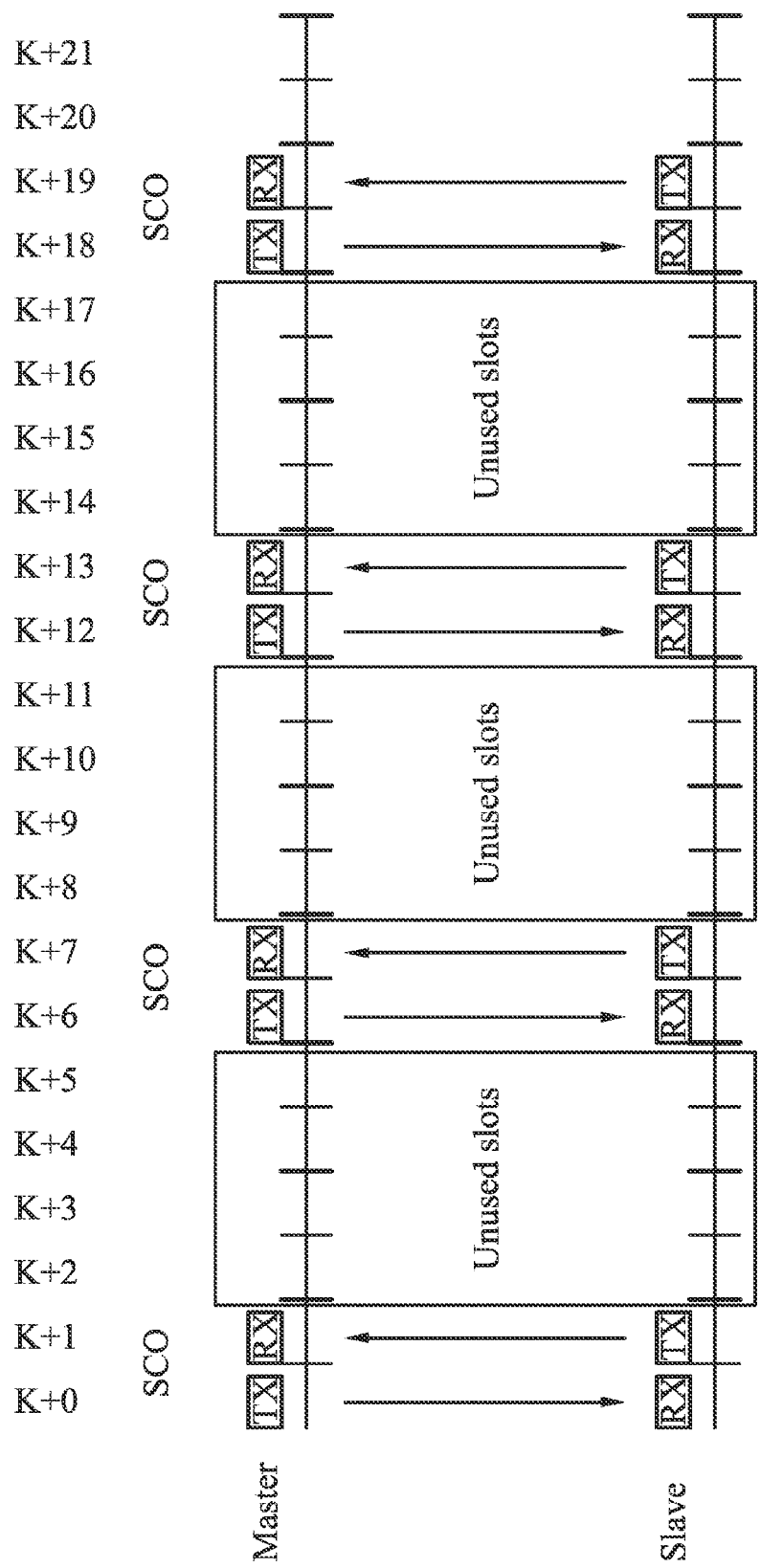
FIG. 15 is a schematic diagram illustrating HV3 packet transmissions at every six slots.
Figure 16:
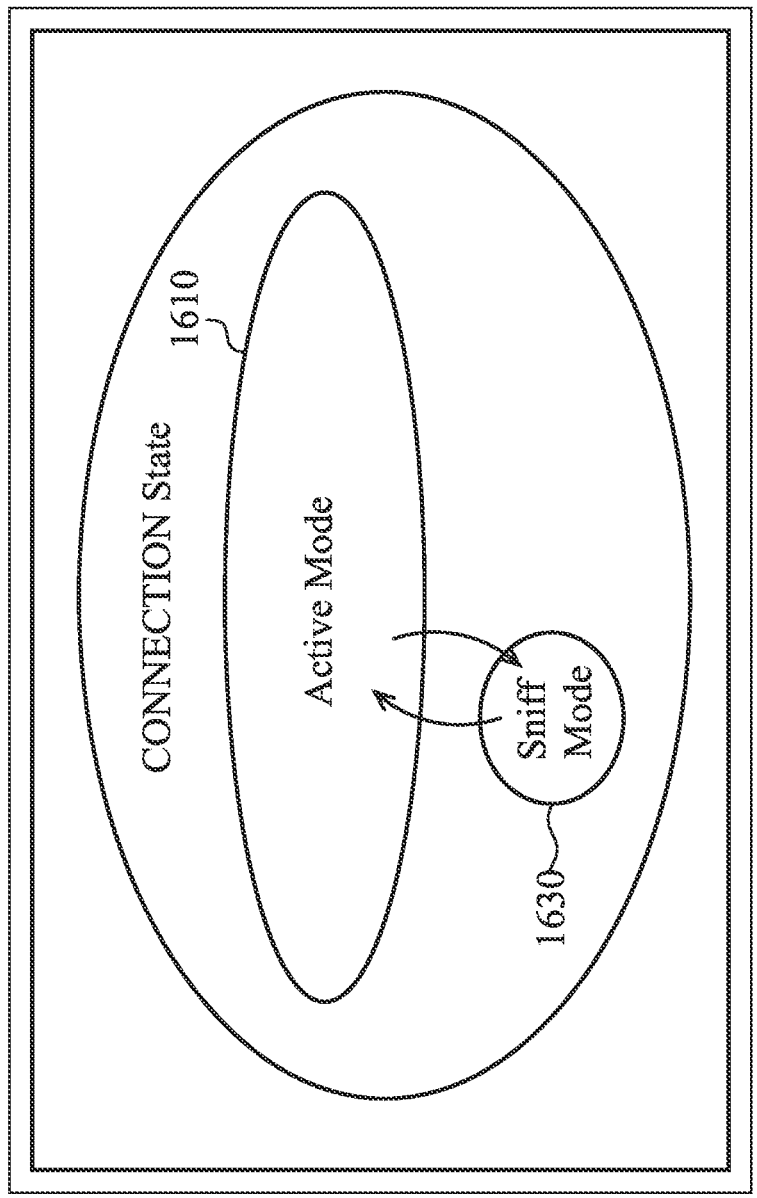
FIG. 16 is a diagram illustrating an exemplary connection state for the asynchronous connection oriented (ACL) link.
Figure 17:
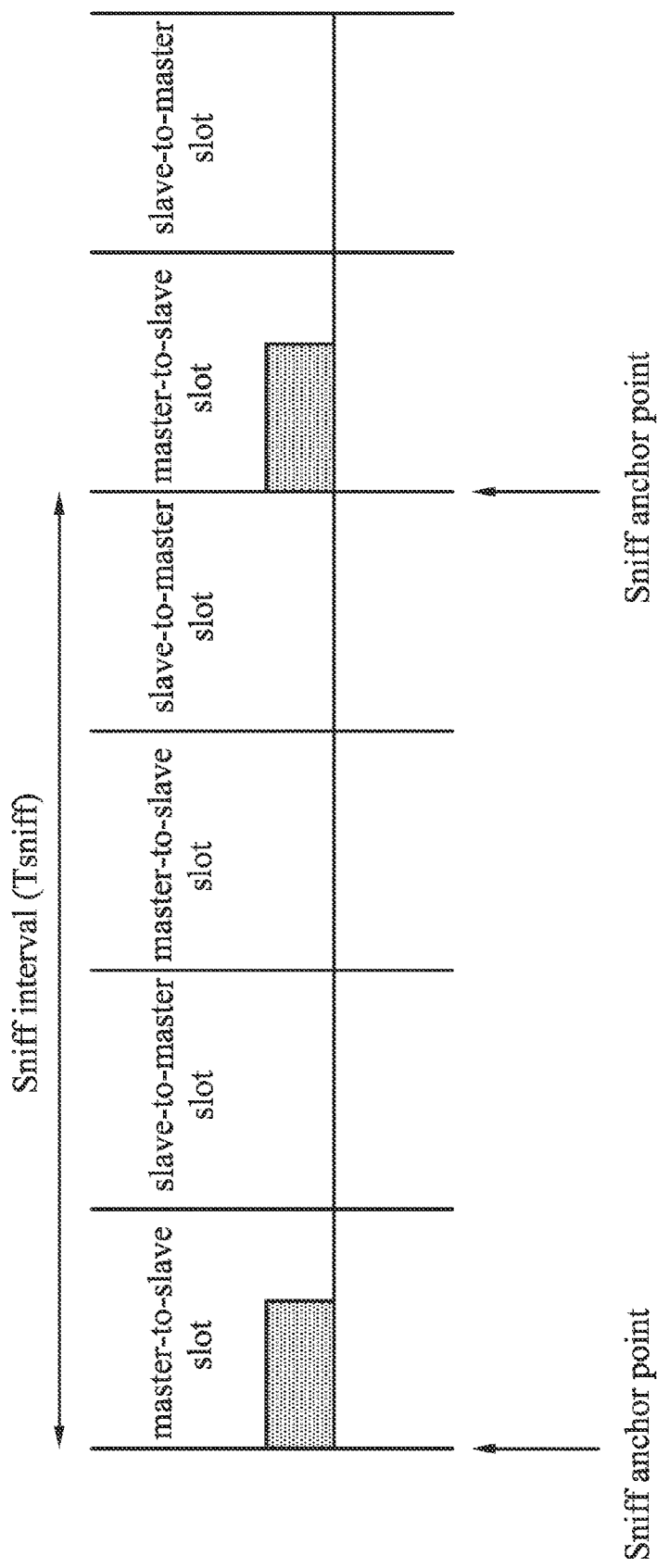
FIG. 17 is a diagram illustrating sniff anchor points.
Figure 18:
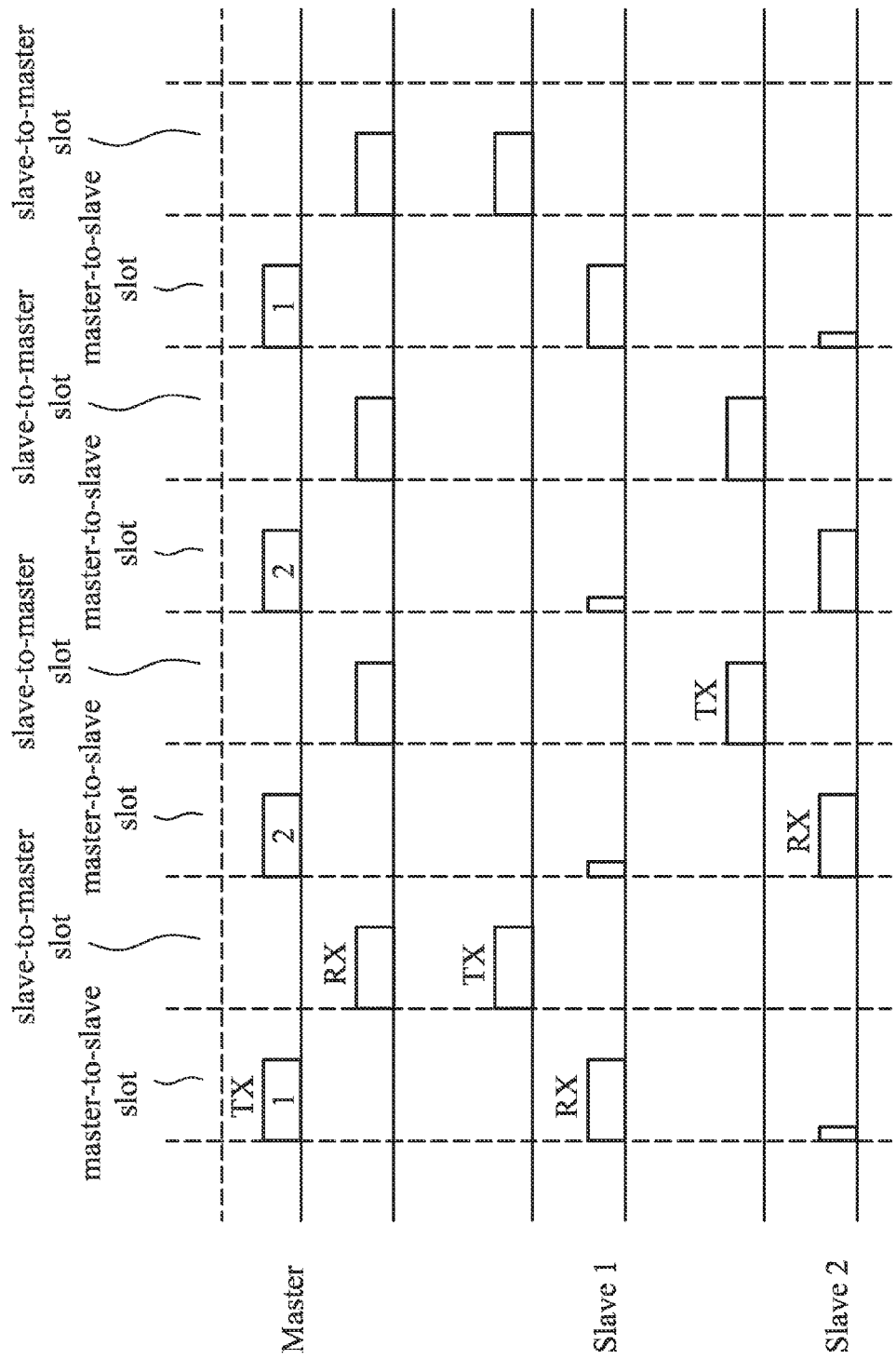
FIG. 18 is a diagram illustrating data transmissions among master and slave devices.

The Bluetooth handset 1033 may operate as a master device controlling the PAN and the Bluetooth module 1430 may operate as a slave device wirelessly connected to the master device. Two types of connections may be used for communication between a master device and a slave device: SCO/eSCO (synchronous connection oriented/extended synchronous connection oriented) links; and ACL (asynchronous connection oriented) links. The SCO/eSCO link (also called synchronization link) is a symmetric, point-to-point link between a master device and a specific slave device. The master device maintains the SCO/eSCO link by using reserved slots at regular intervals. After establishing the SCO/eSCO link, some synchronous packets (such as HV and DV packets) are typically used for voice transmissions and are not retransmitted. The master device sends synchronous packets at regular intervals, for example, every 2, 4 or 6 slots, depending on packet type used for transmission, where each slot is 625 μs typically. HV and DV packets are typically transmitted via the SCO link and EV packets are typically transmitted via the eSCO link. Exemplary HV3 packet transmissions at every six slots are depicted in FIG. 15. The ACL link (also called asynchronization link) is a point-multipoint link between the master device and all slave devices participating on a PAN. No slot is reserved for the ACL link. The master device establishes an ACL link on a per-slot basis to any slave device. After establishing the ACL link (i.e. entering connection state), ACL packets (such as DM, DH and AUX packets) are typically used for data transmissions. In addition, the master device regularly transmits packets to keep slave devices synchronizing to the channel. An exemplary connection state for the ACL link is illustrated in FIG. 16. During the active mode of connection state 1610, both master and slave devices actively participate on a channel. The master device schedules the transmission based on traffic demand to and from different slave devices. If an active slave device is not addressed, the active slave device sleeps until the next master transmission. During a sniff mode of the connection state 1630, the slots when a slave device listens to are reduced to save power consumption. Additionally, during the sniff mode 1630, the master device switches between transmitting and receiving packets to and from a slave device in the sniff attempts containing 2, 4, 6 or 8 slots or more, after reaching sniff anchor points. FIG. 17 illustrates sniff anchor points. The sniff anchor points are regularly spaced with an interval of $T_{sniff}$. During an active mode of a connection state M1610, the master device transmits data to a slave device in any of the master-to-slave slots. During the sniff mode 1630, a master device transmits data to a slave device in one or more of the master-to-slave slots of a sniff attempt after a sniff anchor point (e.g. a sniff attempt of Tsniff of FIG. 17 after a sniff anchor point). FIG. 18 is a diagram illustrating data transmissions among master and slave devices. In both active and sniff modes, a slave device transmits data to a master device in a slave-to-master slot after receiving data from the master device in a prior master-to-slave slot. A slave device may transmit a data packet (also referred to as transmitting data) or a null packet (also referred to as acknowledging) to a master device after receiving a poll/null packet (also referred to as polled by the mater node) or a data packet (also referred to as receiving data) from the master device. In order to prevent the ACL link from disconnection, during the active mode 1610, a slave device frequently listens in master-to-slave slots, and during the sniff mode 1630, a slave device listens in master-to-slave slots when reaching sniff anchor points. It should be noted that the ACL link to a slave device is automatically disconnected by a master device if no response is received after a predetermined number of pollings or transmissions, or for a predetermined time period. Referring to FIG. 10, the cellular phone 1031 and the Bluetooth handset 1033 may be compatible with Advanced Audio Distribution Profile (A2DP). A uni-directional 2-channel stereo audio stream, such as an MPEG-1, MPEG-2, MPEG-4, Advanced Audio Coding (AAC), Adaptive Transform Acoustic Coding (ATRAC), or other audio streams, may be delivered from the Bluetooth module 1430 to the Bluetooth handset using ACL links. The arbitrator 1451 may allocate unused Bluetooth slots to the WLAN module 1410 for obtaining buffered packets from the AP 1011.

Figure 19:
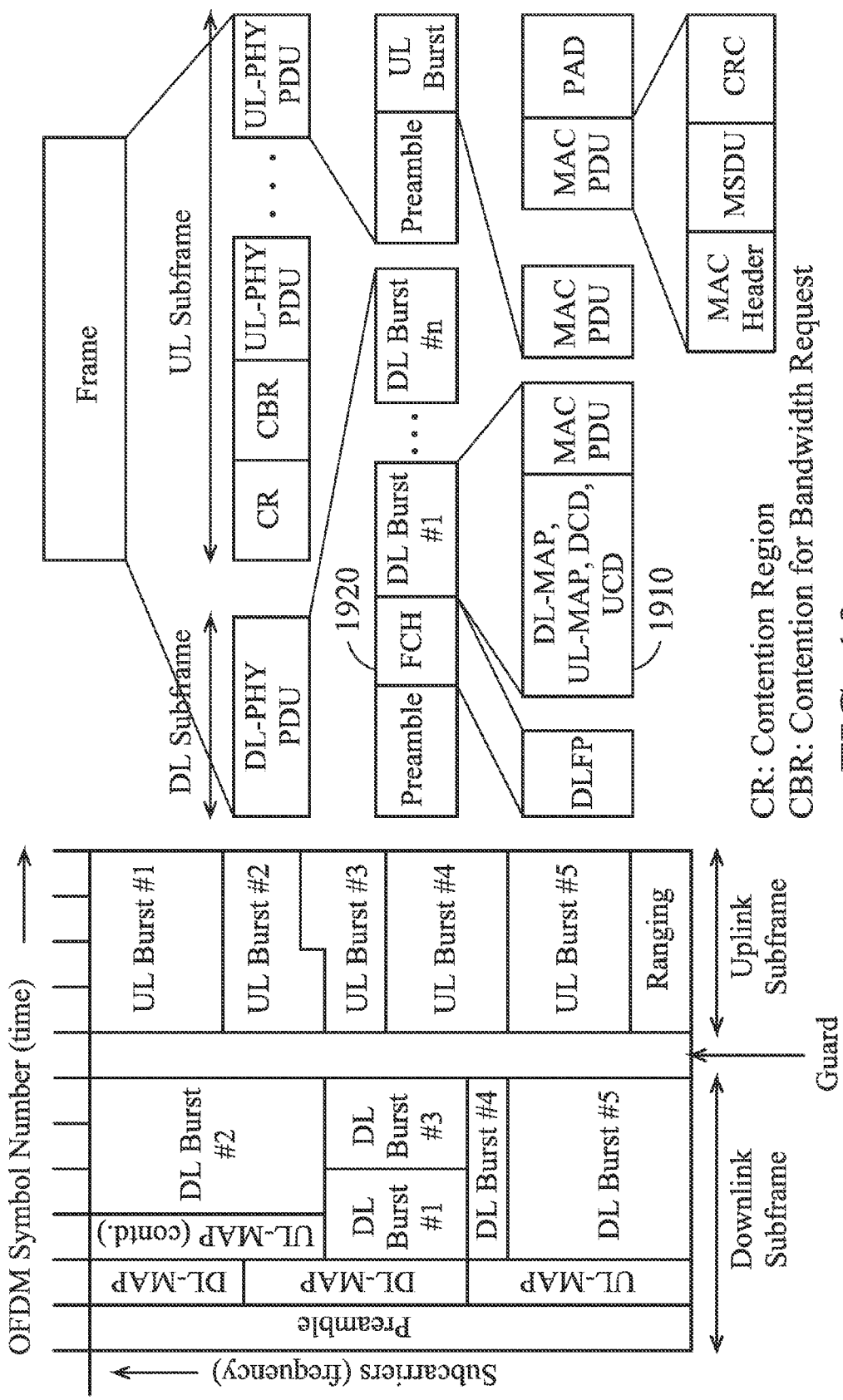
FIG. 19 is a diagram of an exemplary TDD frame structure for mobile WiMAX.
Figure 20:
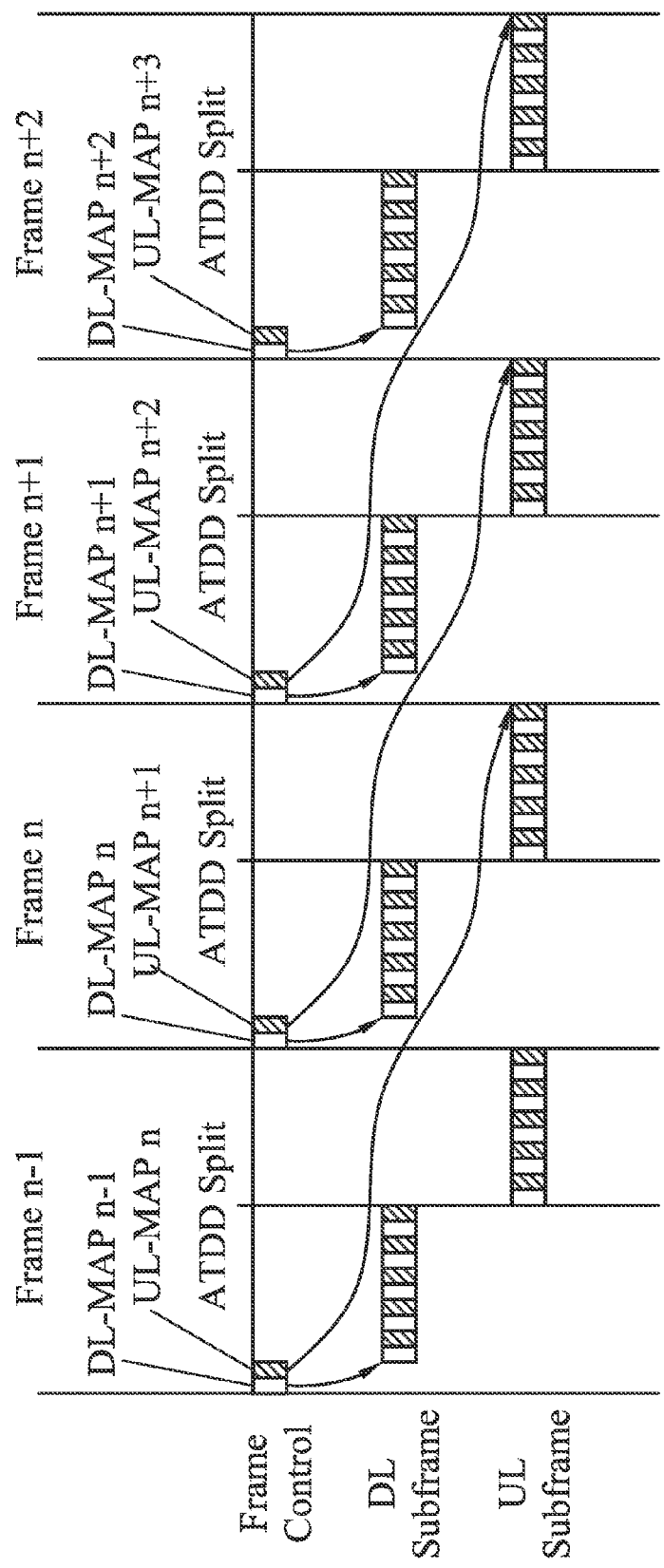
FIG. 20 is a diagram of exemplary time relevance of DL-MAP and UL-MAP (TDD)

Referring to FIG. 14, the WiMAX MAC unit 1437 may obtain a downlink subframe from the WiMAX base station 1251, providing frame configuration information, such as a MAP message length, the modulation and coding scheme, and the usable subcarriers. As shown in FIG. 19, the downlink subframe begins with a downlink preamble that is used for physical-layer procedures, such as time and frequency synchronization and initial channel estimation. The WiMAX module 1430 may be allocated data regions within a frame, and these allocations are specified in the uplink and downlink MAP messages (DL-MAP and UL-MAP) 1910 that are broadcast following a frame control header (FCH) 1920. Referring to FIG. 20, the DL-MAP message specifies the slot allocations of the current DL subframe for all users including the WiMAX module 1430 while the UL-MAP message specifies the slot allocations of the next UL subframe. The arbitrator 1451 may accordingly allocate unused WiMAX slots to the WLAN module 1410 for obtaining buffered packets from the AP 1011.

Figure 21:
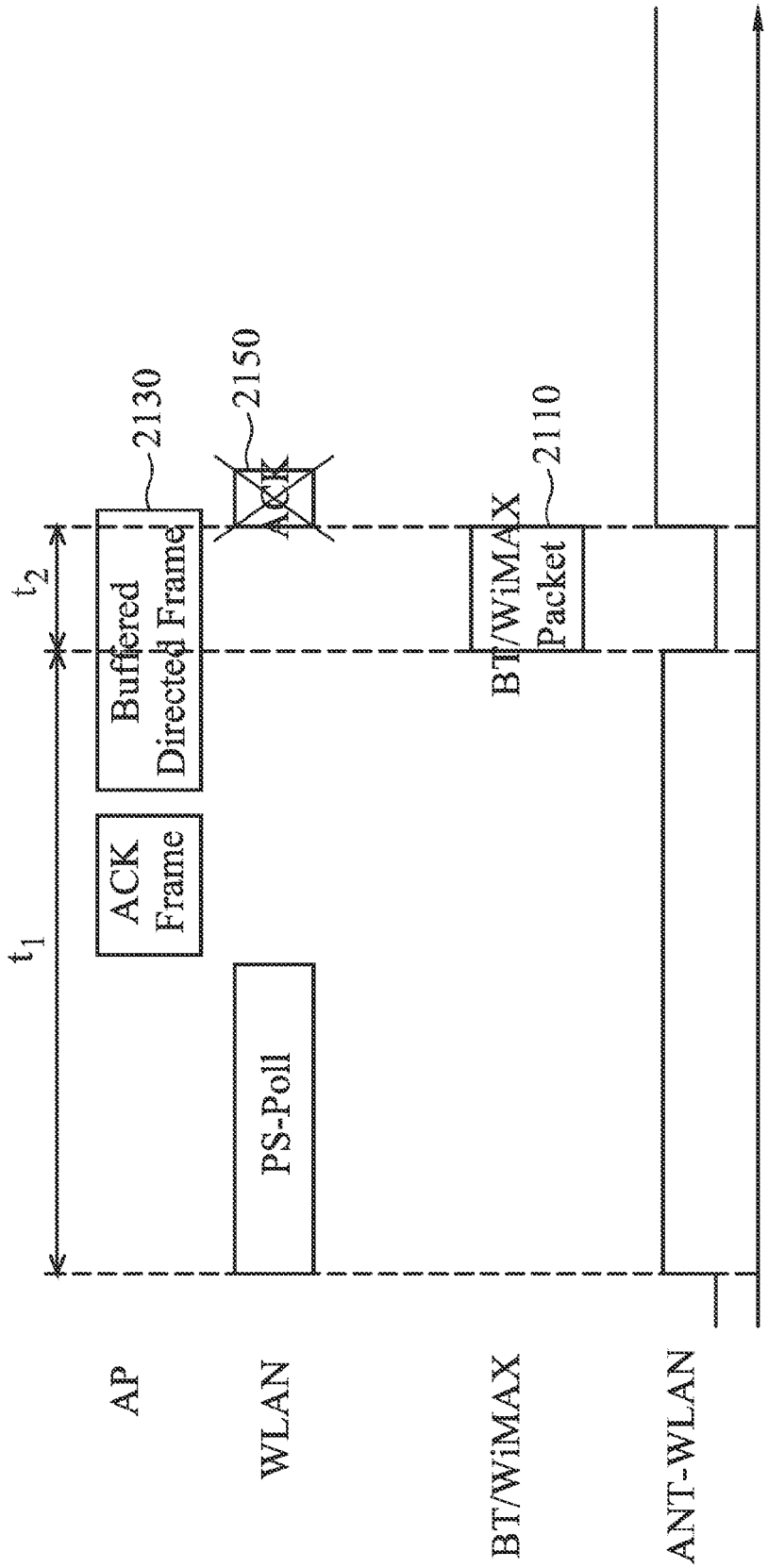
FIG. 21 shows a schematic diagram of frame exchange for obtaining buffered packets in a time line with a Bluetooth/WiMAX packet transmission.
Figure 22:
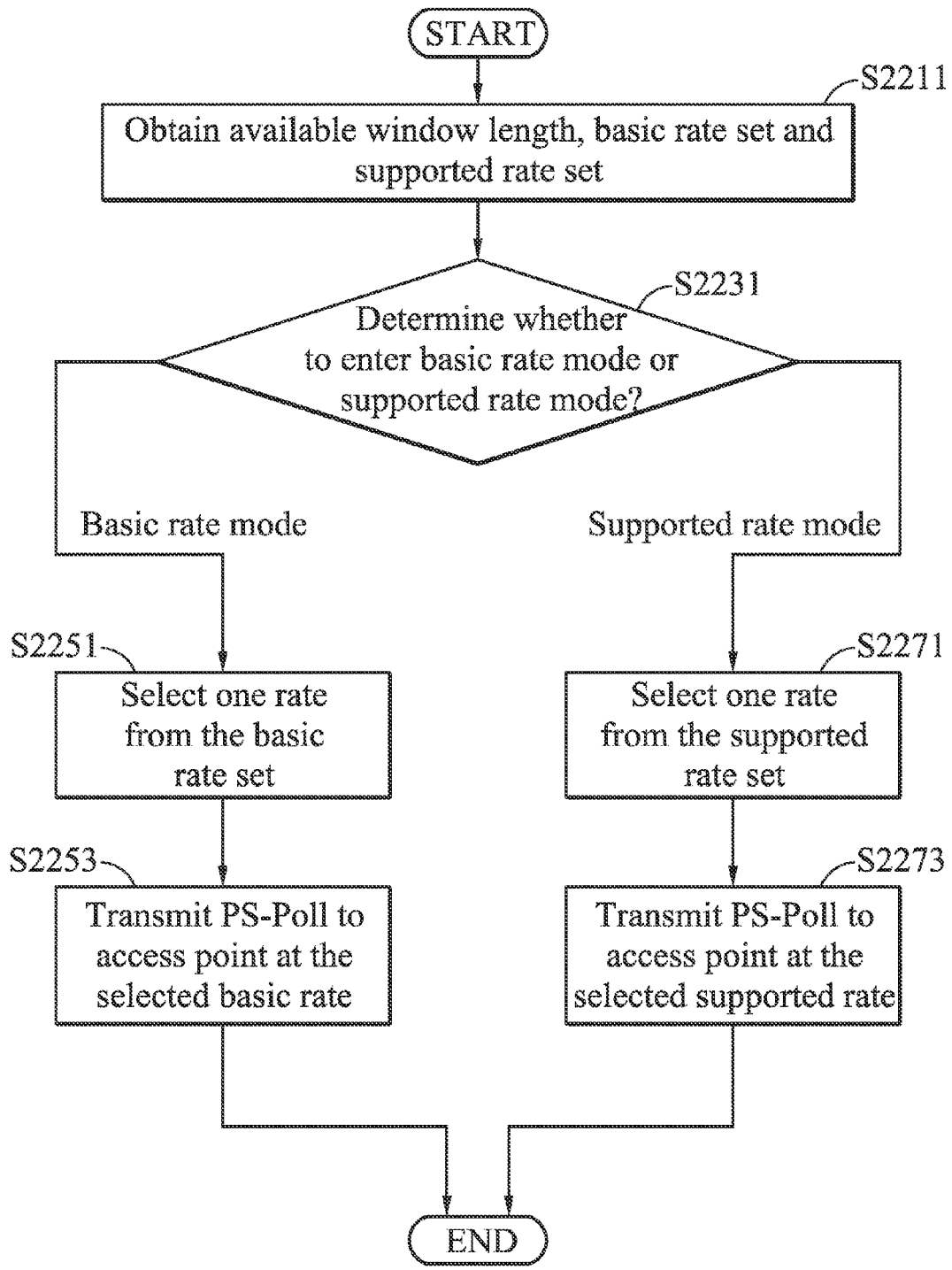
FIG. 22 is a flow chart illustrating an embodiment of a method for obtaining buffered data from an AP in a coexistence system.
Figure 23:
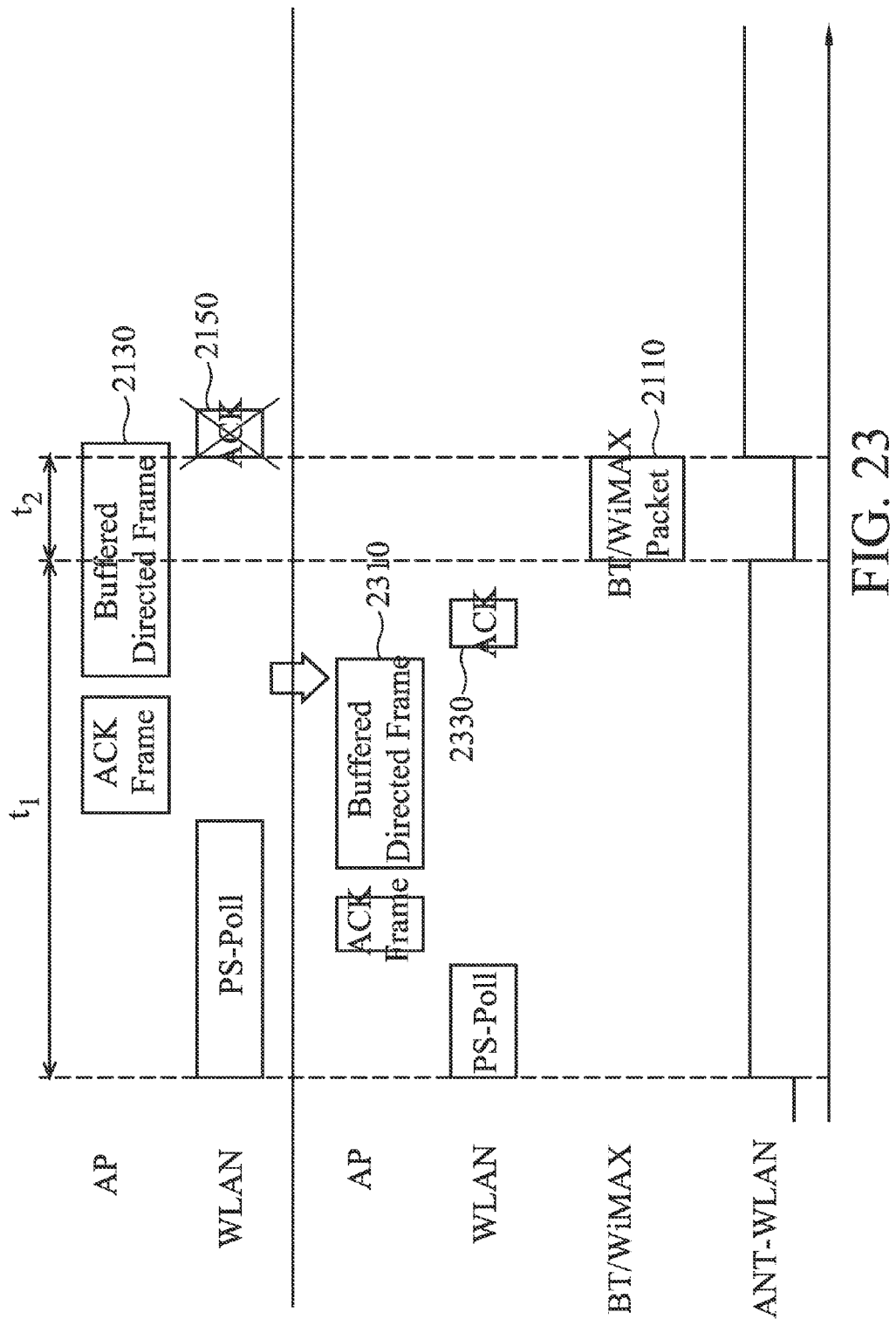
FIG. 23 shows a schematic diagram of frame exchange using different rates for obtaining buffered packets in a time line with a Bluetooth/WiMAX packet transmission.

The unused slot mentioned earlier (may also be called an available window) between two Bluetooth or WiMAX transmissions, however, may be too short to ensure that the retrieving of buffered packets can be successful finished when a PS-Poll is delivered using the basic rate. For example, since an available window for Bluetooth A2DP transmissions or others, denoted in $t_1$ of FIG. 21, is about 800 μs or less, the BT/WiMAX packet transmission during $t_2$ is interfered with by the buffered packet transmission 2130 following a PS-Poll at 1 or 2 Mb/s and the acknowledgement 2150 may not be replied to the AP 1011 or 1201. Moreover, as discussed earlier, using the basic rate (i.e. a lower rate) to send the PS-Poll consumes more battery power and processing time while using the supported rate (i.e. a higher rate) may lead to unsuccessful receipt of the PS-Poll resulting from the higher BER or shortened effective range. An embodiment of a method, as shown in FIG. 22 and performed in the WLAN MAC unit 1417, is introduced to leverage the above drawbacks and efficiently obtain buffered packets from the AP. Available window length, basic rate set and supported rate set are obtained once the WLAN module 1031*a*, 1231*a* or 1410 (especially 1417) awakens (step S2211). The available window length may be obtained from a given slot scheduled by the arbitrator 1451 (also referred to as centralized scheduling), or requested by the WLAN MAC unit 1417 and subsequently acknowledged by the arbitrator 1451 (also referred to as ad-hoc request and response). The basic and supported rate sets may be obtained from a buffered memory, which are obtained from a received Beacon, Probe Response, Association Response or Reassociation Response management frame as described earlier. It is determined to enter a supported rate mode when at least one of the following conditions is met (step S2231):
(1) the available window length is not sufficient enough to obtain buffered packets following a PS-Poll at any basic rate;
(2) the remaining battery power is less than a predetermined threshold; and
(3) a strength of the received signals from the AP 1011 or 1201 exceeds a predetermined threshold.
Otherwise, a basic rate mode is determined (step S2231). In the basic rate mode, one rate is selected from the basic rate set (step S2251) and PS-Poll is transmitted at the selected basic rate to the AP 1011 or 1201 (step S2253). In the supported rate mode, one rate is selected from the supported rate set (step S2271) and PS-Poll is transmitted at the selected supported rate to the AP 1011 or 1201 (step S2273). It is to be understood that, in the supported rate mode as shown in the lower part of FIG. 23, the buffered packet transmission 2310 and the corresponding acknowledgement 2330 following a PS-Poll and the corresponding ACK Frame at 24 Mb/s can fit into the available window $t_1$ which is shorter than 800 μs, avoiding interference with the later Bluetooth/WiMAX packet transmission.

Figure 24:
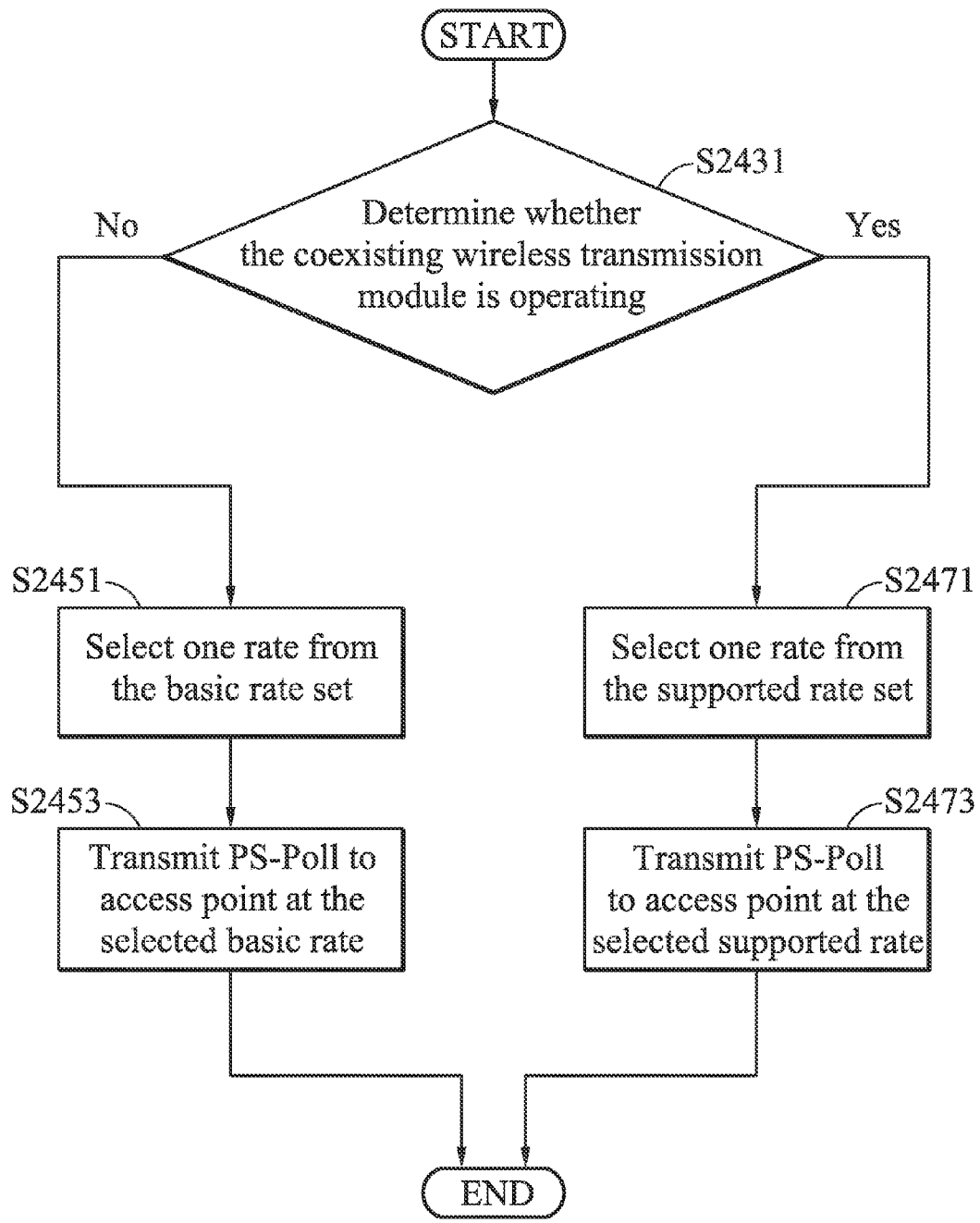
FIG. 24 is a flow chart illustrating an embodiment of a method for obtaining buffered data from an AP in a coexistence system.

As mentioned above, when a Bluetooth/WiMAX transmission occurs on a frequency that lies within the frequency space occupied by a simultaneous WLAN transmission, a certain level of interference may occur, depending on the strength of each signal. Therefore, avoiding interference between a WLAN transmission and a coexisting wireless transmission (Bluetooth/WiMAX transmission) is important for the coexistence system especially when the WLAN transmission and the coexisting wireless transmission are operating at the same time. An embodiment of a method, as shown in FIG. 24 and performed in the WLAN MAC unit 1417, is provided to obtain buffered packets from the AP in a coexisting system. It is determined whether a coexisting transmission module, such as the Bluetooth/WiMAX module 1430 in FIG. 14, is operating (step S2431). If the coexisting transmission module is operating, a certain level of interference may occur when the coexisting transmission occurs on a frequency that lies within the frequency space occupied by the simultaneous WLAN transmission. Therefore, in order to avoid interference, one supported rate is selected from the supported rate set (step S2471) and PS-Poll is transmitted at the selected supported rate to the AP 1011 or 1201 (step S2473) when the coexisting transmission module is operating (step S2431: Yes). Otherwise, when the coexisting transmission module is not operating (step S2431: No), one basic rate is selected from the basic rate set (step S2451) and PS-Poll is transmitted at the selected basic rate to the AP 1011 or 1201 (step S2453). The basic and supported rate sets may be obtained from a buffered memory, which are obtained from a received Beacon, Probe Response, Association Response or Reassociation Response management frame as described earlier. When transmitting the PS-Poll at the selected supported rate, as shown in the lower part of FIG. 23, the buffered packet transmission 2310 and the corresponding acknowledgement 2330 following a PS-Poll and the corresponding ACK Frame at 24 Mb/s can fit into an available window $t_1$, avoiding interference with the later Bluetooth/WiMAX packet transmission.

For further details, examples of how to determine whether the coexisting transmission module are described hereinafter. Whether the coexisting wireless transmission module is operating may be determined according to an operating status of the coexisting wireless transmission module. Referring to FIG. 10, in one example, once the coexisting wireless transmission module (Bluetooth/WiMAX module 1430) changes its operating status (operating/not operating), the Bluetooth/WiMAX MAC unit 1437 informs the arbitrator 1451 of the current operating status. When the WLAN MAC unit 1417 is to determine whether the coexisting wireless transmission module is operating, the WLAN MAC unit 1417 transmits a request for the operating status of the Bluetooth/WiMAX module 1430 to the arbitrator 1451. Then the arbitrator 1451 transmits a response containing the current operating status informed by the Bluetooth/WiMAX MAC unit 1437. Therefore, the WLAN MAC unit 1417 may know whether the Bluetooth/WiMAX module 1430 is operating according to the response from the arbitrator 1451.

In another example, the WLAN MAC unit 1417 may transmit a request for the operating status of the coexisting wireless transmission module directly to the Bluetooth/WiMAX MAC unit 1437 when determining whether the Bluetooth/WiMAX module 1430 is operating. Then, the Bluetooth/WiMAX MAC unit 1437 transmits a response for the operating status of the Bluetooth/WiMAX module 1430 to the WLAN MAC unit 1417. Therefore, the WLAN MAC unit 1417 may know whether the Bluetooth/WiMAX module 1430 is operating according to the response from the Bluetooth/WiMAX MAC unit 1437.

In still another example, once the operating status of the Bluetooth/WiMAX module 1430 is changed, for example, every time the Bluetooth/WiMAX module 1430 is enabled or disabled, the Bluetooth/WiMAX MAC unit 1437 transmits the current operating status of the Bluetooth/WiMAX module 1430 directly to the WLAN MAC unit 1417. Therefore, the WLAN MAC unit 1417 may cache and know whether the Bluetooth/WiMAX module 1430 is operating according to the operating information previously transmitted by the Bluetooth/WiMAX MAC unit 1437.

Figure 25:
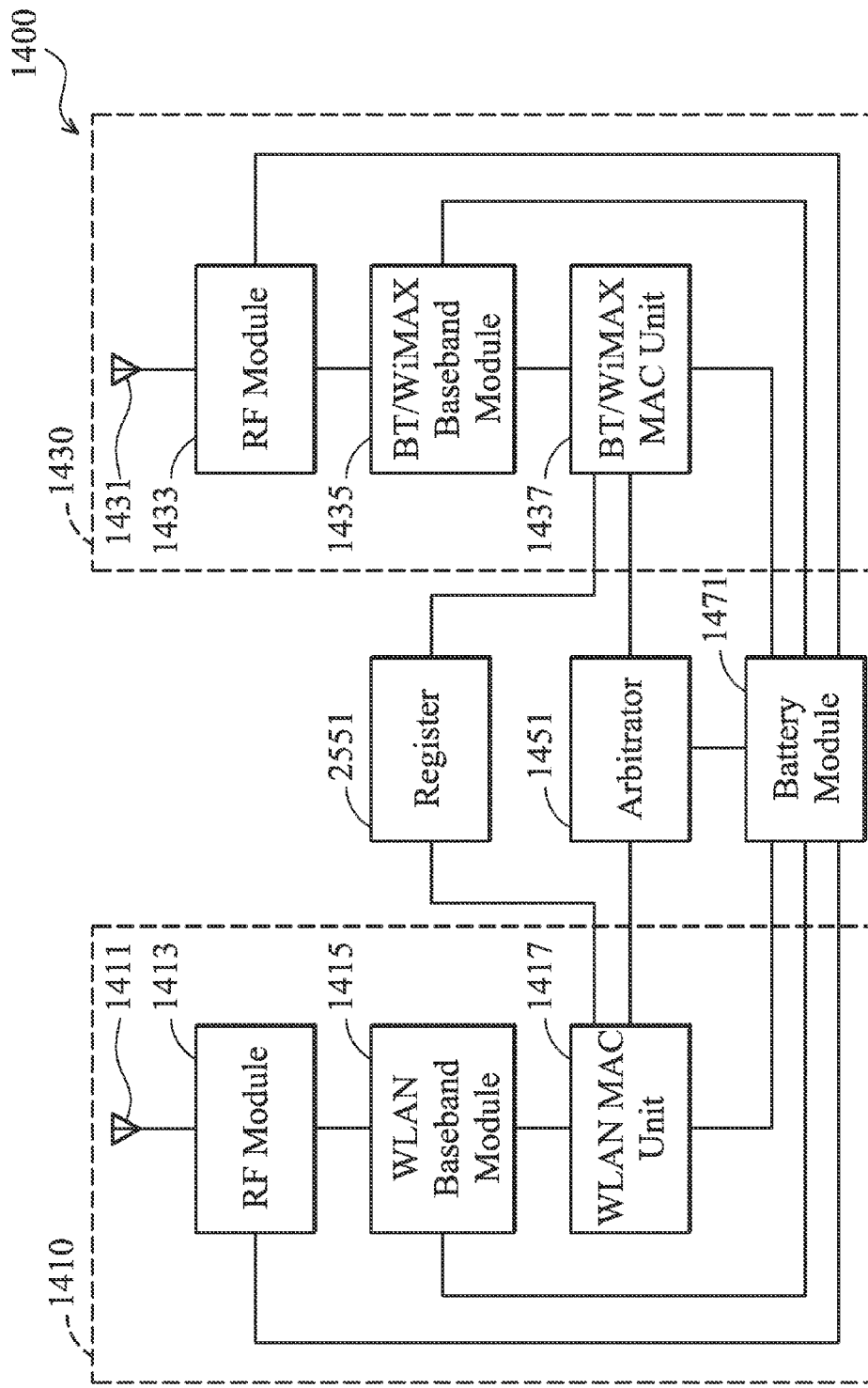
FIG. 25 shows a hardware architecture of another embodiment of a system for coexistence of WLAN and Bluetooth/WiMAX modules.

In still another example, a register 2551 as shown in FIG. 25 stores the operating status of the Bluetooth/WiMAX module 1430 written by the Bluetooth/WiMAX MAC unit 1437. The operating status of the Bluetooth/WiMAX module 1430 may be stored as a flag or a digital value. For example, '0' indicates that the Bluetooth/WiMAX module 1430 is not operating and '1' indicates that the Bluetooth/WiMAX module 1430 is operating. In FIG. 25, the same reference numbers indicate the same elements as in FIG. 14. Once the operating status of the Bluetooth/WiMAX module 1430 is changed, the Bluetooth/WiMAX MAC unit 1437 changes the operating status in the register accordingly. Therefore, when the WLAN MAC unit 1417 is to determine whether the Bluetooth/

WiMAX module 1430 is operating, the WLAN MAC unit 1417 accesses the register to obtain the operating status from the register.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for the coexistence of a wireless local area network (WLAN) in a power saving mode and another type of wireless transmission, comprising:
   a WLAN module transmitting a polling request (PS-Poll) at a supported rate higher than any basic rate in order to obtain buffered data from an access point (AP) when a coexisting wireless transmission module is operating,
   wherein the supported rate is encoded in a supported rate set announced by the AP, and the basic rate is encoded in a basic rate set announced by the AP, and the PS-Poll is a polling request relating to a power saving mode of operation.

2. The system as claimed in claim 1, wherein each rate of the supported rate set is encoded as a digital value with a most significant bit (MSB) set to 1, and each rate of the basic rate set is encoded as a digital value with MSB set to 0.

3. The system as claimed in claim 1, wherein the WLAN module transmits the PS-Poll at a basic rate selected from the basic rate set when the coexisting wireless transmission module is not operating.

4. The system as claimed in claim 1, wherein the WLAN module further obtaining an operating status of the coexisting wireless transmission module, indicating whether the coexisting wireless transmission module is operating.

5. The system as claimed in claim 4, further comprising:
   an arbitrator coordinating wireless transmission between the coexisting wireless transmission module and the WLAN module,
   wherein the coexisting wireless transmission module informs the arbitrator of its operating status, and the WLAN module transmits a request for the operating status of the coexisting wireless transmission module to the arbitrator, and the arbitrator transmits a response containing the operating status to the WLAN module in response to the request.

6. The system as claimed in claim 4, further comprising:
   a register storing the operating status of the coexisting wireless transmission module written by the coexisting wireless transmission module,
   wherein the WLAN module accesses the register to obtain the operating status of the coexisting wireless transmission module.

7. The system as claimed in claim 4, wherein the WLAN module transmits a request for the operating status to the coexisting wireless transmission module and the coexisting wireless transmission module transmits a response containing its operating status to the WLAN module in response to the request.

8. The system as claimed in claim 4, wherein the coexisting wireless transmission module transmits the current operating status to the WLAN module once the operating status is changed.

9. The system as claimed in claim 1, further comprising the coexisting wireless transmission module, wherein the coexisting wireless transmission module performs Advanced Audio Distribution Profile (A2DP) transmissions using an asynchronous connection oriented (ACL) link in the first and second slots.

10. A method for wireless local area network (WLAN) transmission, performed by a media access control (MAC) unit, comprising:
    transmitting a polling request (PS-Poll) at a supported rate higher than any basic rate in order to obtain buffered data from an access point (AP) when a coexisting Bluetooth or WiMAX module is operating,
    wherein the supported rate is encoded in a supported rate set announced by the AP, and the basic rate is encoded in a basic rate set announced by the AP.

11. The method as claimed in claim 10, further comprising:
    determining whether the buffered data in response to the PS-Poll is successfully received from the AP; and
    selecting one basic rate from the basic rate set and re-transmitting the PS-Poll at the selected basic rate to the AP when the buffered data is not successfully received.

12. The method as claimed in claim 10, further comprising:
    obtaining an operating status of the coexisting Bluetooth or WiMAX module, indicating whether the coexisting wireless transmission module is operating; and
    transmitting the PS-poll at one basic rate to the AP when the coexisting Bluetooth or WiMAX module is not operating.

13. The method as claimed in claim 12, wherein in the obtaining step further comprises obtaining the operating status of the Bluetooth or WiMAX module by requesting an arbitrator.

14. The method as claimed in claim 12, wherein in the obtaining step further comprises obtaining the operating status of the coexisting Bluetooth or WiMAX module by accessing a register, wherein the coexisting Bluetooth or WiMAX module writes its operating status in the register once the operating status changes.

15. The method as claimed in claim 12, wherein in the obtaining step further comprises obtaining the operating status of the coexisting Bluetooth or WiMAX module by requesting the coexisting Bluetooth or WiMAX module.

16. The method as claimed in claim 12, wherein in the obtaining step further comprises obtaining the operating status of the coexisting Bluetooth or WiMAX module through instant notification from the coexisting Bluetooth or WiMAX module.

* * * * *